(12) United States Patent
Fleischer et al.

(10) Patent No.: US 8,780,526 B2
(45) Date of Patent: Jul. 15, 2014

(54) ELECTRICAL DEVICES CONTAINING CARBON NANOTUBE-INFUSED FIBERS AND METHODS FOR PRODUCTION THEREOF

(75) Inventors: Corey Adam Fleischer, Columbia, MD (US); Lawrence P. Hetzel, Fallston, MD (US); Tushar K. Shah, Fulton, MD (US); Mandel Durwood Floyd, Alexandria, VA (US); Greogry F. Pensero, Abingdon, MD (US); William Patrick Burgess, Finksburg, MD (US); Joseph J. Sedlak, Essex, MD (US); Han Liu, Lutherville-Timonium, MD (US)

(73) Assignee: Applied Nanostructured Solutions, LLC, Baltimore, MD (US)

( * ) Notice: Subject to any disclaimer, the term of this patent is extended or adjusted under 35 U.S.C. 154(b) by 224 days.

(21) Appl. No.: 13/117,071

(22) Filed: May 26, 2011

(65) Prior Publication Data
US 2011/0304964 A1 Dec. 15, 2011

Related U.S. Application Data

(60) Provisional application No. 61/355,097, filed on Jun. 15, 2010.

(51) Int. Cl.
*H01G 9/00* (2006.01)
(52) U.S. Cl.
USPC .......................................................... 361/502
(58) Field of Classification Search
USPC .......................................................... 361/502
See application file for complete search history.

(56) References Cited

U.S. PATENT DOCUMENTS

| | | | |
|---|---|---|---|
| 4,104,083 A | 8/1978 | Hirano | |
| 4,313,084 A | 1/1982 | Hosokawa et al. | |
| 4,488,203 A | 12/1984 | Muranaka et al. | |
| 4,515,107 A | 5/1985 | Fournier et al. | |

(Continued)

FOREIGN PATENT DOCUMENTS

| | | |
|---|---|---|
| CN | 1970612 A | 5/2007 |
| CN | 101189930 A | 5/2008 |

(Continued)

OTHER PUBLICATIONS

Chen et al., Flexible and transparent supercapacitor based on In2O3 nanowire/carbon nanotube heterogeneous films, Jan. 28, 2009, Applied Physicis Letters, vol. 94, 043113-1 to 043113-3.*

(Continued)

*Primary Examiner* — David M Sinclair
(74) *Attorney, Agent, or Firm* — McDermott Will & Emery LLP

(57) ABSTRACT

Electrical devices having a plurality of stacked electrode layers are described. At least one of the electrode layers contains continuous fibers that are infused with carbon nanotubes. The continuous fibers can be disposed upon an electrically conductive base plate. The electrical devices can further contain an electrolyte contacting each electrode layer and a layer of separator material disposed between each electrode layer, in which case the electrical devices can form a supercapacitor. Such supercapacitors can have a capacitance of at least about 1 Farad/gram of continuous fibers. The capacitance can be increased by coating at least a portion of the infused carbon nanotubes with a material such as, for example, a conducting polymer, a main group metal compound, and/or a transition metal compound. Methods for producing the electrical devices are also described.

39 Claims, 3 Drawing Sheets

(56) References Cited

U.S. PATENT DOCUMENTS

| | | | |
|---|---|---|---|
| 4,530,750 A | 7/1985 | Aisenberg et al. | |
| 4,581,284 A | 4/1986 | Eggert et al. | |
| 4,707,349 A | 11/1987 | Hjersted | |
| 4,920,917 A | 5/1990 | Nakatani et al. | |
| 5,093,155 A | 3/1992 | Miyazaki et al. | |
| 5,103,067 A | 4/1992 | Aldissi | |
| 5,130,194 A | 7/1992 | Baker et al. | |
| 5,156,225 A | 10/1992 | Murrin | |
| 5,173,367 A | 12/1992 | Liimatta et al. | |
| 5,221,605 A | 6/1993 | Bard et al. | |
| 5,238,808 A | 8/1993 | Bard et al. | |
| 5,246,794 A | 9/1993 | Blomgren et al. | |
| 5,310,687 A | 5/1994 | Bard et al. | |
| 5,449,574 A | 9/1995 | Higley | |
| 5,470,408 A | 11/1995 | Nielson et al. | |
| 5,514,217 A | 5/1996 | Niino et al. | |
| 5,547,525 A | 8/1996 | Bennett et al. | |
| 5,571,749 A | 11/1996 | Matsuda et al. | |
| 5,581,438 A | 12/1996 | Halliop | |
| 5,583,318 A | 12/1996 | Powell | |
| 5,639,984 A | 6/1997 | Nielson | |
| 5,707,758 A | 1/1998 | Iwatsu et al. | |
| 5,714,089 A | 2/1998 | Bard et al. | |
| 5,731,147 A | 3/1998 | Bard et al. | |
| 5,908,585 A | 6/1999 | Shibuta | |
| 5,968,274 A | 10/1999 | Fujioka et al. | |
| 5,997,832 A | 12/1999 | Lieber et al. | |
| 6,140,138 A | 10/2000 | Bard et al. | |
| 6,146,783 A | 11/2000 | Brohm et al. | |
| 6,180,281 B1 | 1/2001 | Schneider et al. | |
| 6,184,280 B1 | 2/2001 | Shibuta | |
| 6,194,685 B1 | 2/2001 | Rutherford | |
| 6,221,154 B1 | 4/2001 | Lee et al. | |
| 6,225,565 B1 | 5/2001 | Prysner | |
| 6,232,706 B1 | 5/2001 | Dai et al. | |
| 6,233,135 B1 | 5/2001 | Farahmandi et al. | |
| 6,251,520 B1 | 6/2001 | Blizzard et al. | |
| 6,265,466 B1 | 7/2001 | Glatkowski et al. | |
| 6,331,209 B1 | 12/2001 | Jang et al. | |
| 6,333,016 B1 | 12/2001 | Resasco et al. | |
| 6,361,861 B2 | 3/2002 | Gao | |
| 6,413,487 B1 | 7/2002 | Resasco et al. | |
| 6,420,293 B1 | 7/2002 | Chang et al. | |
| 6,430,031 B1 | 8/2002 | Dispennette et al. | |
| 6,454,816 B1 | 9/2002 | Lee et al. | |
| 6,455,021 B1 | 9/2002 | Saito | |
| 6,465,057 B1 | 10/2002 | Nakahigashi et al. | |
| 6,479,028 B1 | 11/2002 | Kaner et al. | |
| 6,479,030 B1 | 11/2002 | Firsich | |
| 6,491,789 B2 | 12/2002 | Niu | |
| 6,495,258 B1 | 12/2002 | Chen et al. | |
| 6,528,572 B1 | 3/2003 | Patel et al. | |
| 6,564,744 B2 | 5/2003 | Nakahigashi et al. | |
| 6,585,152 B2 | 7/2003 | Farahmandi et al. | |
| 6,602,742 B2 * | 8/2003 | Maletin et al. | 438/142 |
| 6,639,786 B2 | 10/2003 | Noguchi et al. | |
| 6,650,531 B2 * | 11/2003 | Ikeda et al. | 361/502 |
| 6,653,619 B2 | 11/2003 | Chin et al. | |
| 6,673,392 B2 | 1/2004 | Lee et al. | |
| 6,686,537 B1 | 2/2004 | Gareis et al. | |
| 6,692,717 B1 | 2/2004 | Smalley et al. | |
| 6,765,949 B2 | 7/2004 | Chang | |
| 6,773,466 B1 | 8/2004 | Hiratsuka et al. | |
| 6,790,425 B1 | 9/2004 | Smalley et al. | |
| 6,818,821 B2 | 11/2004 | Fujieda et al. | |
| 6,831,826 B2 | 12/2004 | Iwaida et al. | |
| 6,837,928 B1 | 1/2005 | Zhang et al. | |
| 6,852,410 B2 | 2/2005 | Veedu et al. | |
| 6,863,942 B2 | 3/2005 | Ren et al. | |
| 6,887,451 B2 | 5/2005 | Dodelet et al. | |
| 6,900,264 B2 | 5/2005 | Kumar et al. | |
| 6,900,580 B2 | 5/2005 | Dai et al. | |
| 6,908,572 B1 | 6/2005 | Derbyshire et al. | |
| 6,913,075 B1 | 7/2005 | Knowles et al. | |
| 6,934,600 B2 | 8/2005 | Jang et al. | |
| 6,936,653 B2 | 8/2005 | McElrath et al. | |
| 6,949,237 B2 | 9/2005 | Smalley et al. | |
| 6,955,800 B2 | 10/2005 | Resasco et al. | |
| 6,962,892 B2 | 11/2005 | Resasco et al. | |
| 6,967,013 B2 | 11/2005 | Someya et al. | |
| 6,979,709 B2 | 12/2005 | Smalley et al. | |
| 6,986,853 B2 | 1/2006 | Glatkowski et al. | |
| 6,986,877 B2 | 1/2006 | Takikawa et al. | |
| 6,994,907 B2 | 2/2006 | Resasco et al. | |
| 7,011,760 B2 | 3/2006 | Wang et al. | |
| 7,018,600 B2 | 3/2006 | Yanagisawa et al. | |
| 7,022,776 B2 | 4/2006 | Bastiaens et al. | |
| 7,045,108 B2 | 5/2006 | Jiang et al. | |
| 7,056,452 B2 | 6/2006 | Niu et al. | |
| 7,060,326 B2 | 6/2006 | Hiel et al. | |
| 7,061,749 B2 | 6/2006 | Liu et al. | |
| 7,074,294 B2 | 7/2006 | Dubrow | |
| 7,085,125 B2 | 8/2006 | Sung | |
| 7,094,386 B2 | 8/2006 | Resasco et al. | |
| 7,105,596 B2 | 9/2006 | Smalley et al. | |
| 7,108,841 B2 | 9/2006 | Smalley et al. | |
| 7,118,693 B2 | 10/2006 | Glatkowski et al. | |
| 7,125,502 B2 | 10/2006 | Smalley et al. | |
| 7,125,534 B1 | 10/2006 | Smalley et al. | |
| 7,132,621 B2 | 11/2006 | Kumar et al. | |
| 7,144,563 B2 | 12/2006 | Rao et al. | |
| 7,148,619 B2 | 12/2006 | Ken et al. | |
| 7,151,129 B2 | 12/2006 | Ishikawa et al. | |
| 7,153,452 B2 | 12/2006 | Ogale et al. | |
| 7,157,068 B2 | 1/2007 | Li et al. | |
| 7,160,532 B2 | 1/2007 | Liu et al. | |
| 7,189,959 B1 | 3/2007 | Morison et al. | |
| 7,211,320 B1 | 5/2007 | Cooper et al. | |
| 7,226,643 B2 | 6/2007 | Juang et al. | |
| 7,235,159 B2 | 6/2007 | Gu et al. | |
| 7,253,442 B2 | 8/2007 | Huang et al. | |
| 7,261,779 B2 | 8/2007 | Gardner | |
| 7,265,174 B2 | 9/2007 | Carroll et al. | |
| 7,265,175 B2 | 9/2007 | Winey et al. | |
| 7,278,324 B2 | 10/2007 | Smits et al. | |
| 7,289,312 B2 | 10/2007 | Duff, Jr. | |
| 7,294,302 B2 | 11/2007 | Koide et al. | |
| 7,312,608 B2 | 12/2007 | Georgeson et al. | |
| 7,329,698 B2 | 2/2008 | Noguchi et al. | |
| 7,338,684 B1 | 3/2008 | Curliss et al. | |
| 7,340,134 B1 | 3/2008 | Hudson, II et al. | |
| 7,352,559 B2 | 4/2008 | Sung | |
| 7,354,877 B2 | 4/2008 | Rosenberger et al. | |
| 7,354,881 B2 | 4/2008 | Resasco et al. | |
| 7,354,988 B2 | 4/2008 | Charati et al. | |
| 7,372,880 B2 | 5/2008 | Jablonski et al. | |
| 7,384,663 B2 | 6/2008 | Olry et al. | |
| 7,399,794 B2 | 7/2008 | Harmon et al. | |
| 7,407,640 B2 | 8/2008 | Barrera et al. | |
| 7,407,901 B2 | 8/2008 | Bystricky et al. | |
| 7,410,628 B2 | 8/2008 | Bening et al. | |
| 7,419,601 B2 | 9/2008 | Cooper et al. | |
| 7,431,965 B2 | 10/2008 | Grigorian et al. | |
| 7,435,476 B2 | 10/2008 | Viswanathan et al. | |
| 7,442,284 B2 | 10/2008 | Ren et al. | |
| 7,445,817 B2 | 11/2008 | Kumar et al. | |
| 7,448,441 B2 | 11/2008 | Hendricks et al. | |
| 7,448,931 B2 | 11/2008 | Liu et al. | |
| 7,459,627 B2 | 12/2008 | Lee et al. | |
| 7,465,605 B2 | 12/2008 | Raravikar et al. | |
| 7,466,539 B2 | 12/2008 | Dementiev et al. | |
| 7,473,466 B1 | 1/2009 | Muradov | |
| 7,479,052 B2 | 1/2009 | Kim et al. | |
| 7,488,455 B2 | 2/2009 | Dai et al. | |
| 7,504,078 B1 | 3/2009 | Jacques et al. | |
| 7,510,695 B2 | 3/2009 | Smalley et al. | |
| 7,531,267 B2 | 5/2009 | Kim | |
| 7,532,454 B2 | 5/2009 | Plee et al. | |
| 7,534,486 B2 | 5/2009 | Boerstoel et al. | |
| 7,553,341 B2 | 6/2009 | Pan et al. | |
| 7,563,411 B2 | 7/2009 | Jiang et al. | |
| 7,563,428 B2 | 7/2009 | Resasco et al. | |
| 7,569,425 B2 | 8/2009 | Huang et al. | |
| 7,579,112 B2 | 8/2009 | Chiang et al. | |

(56) References Cited

U.S. PATENT DOCUMENTS

| | | |
|---|---|---|
| 7,588,700 B2 | 9/2009 | Kwon et al. |
| 7,592,248 B2 | 9/2009 | Ventzek et al. |
| 7,597,869 B2 | 10/2009 | Hsiao |
| 7,608,798 B2 | 10/2009 | Kumar et al. |
| 7,611,579 B2 | 11/2009 | Lashmore et al. |
| 7,612,985 B2 | 11/2009 | Dementiev et al. |
| 7,615,204 B2 | 11/2009 | Ajayan et al. |
| 7,615,205 B2 | 11/2009 | Jiang et al. |
| 7,632,550 B2 | 12/2009 | Mizuno et al. |
| 7,632,569 B2 | 12/2009 | Smalley et al. |
| 7,700,943 B2 | 4/2010 | Raravikar et al. |
| 7,709,087 B2 | 5/2010 | Majidi et al. |
| 7,718,220 B2 | 5/2010 | D'Silva et al. |
| 7,771,798 B1 | 8/2010 | Grosse et al. |
| 7,776,777 B2 | 8/2010 | Kim et al. |
| 7,793,653 B2 | 9/2010 | Kuckelkorn et al. |
| 7,811,632 B2 | 10/2010 | Eres |
| 7,815,820 B2 | 10/2010 | Tan et al. |
| 7,816,709 B2 | 10/2010 | Balzano et al. |
| 7,820,329 B2 | 10/2010 | Boulton et al. |
| 7,862,795 B2 | 1/2011 | Zhang et al. |
| 7,871,591 B2 | 1/2011 | Harutyunyan et al. |
| 7,880,376 B2 | 2/2011 | Takai et al. |
| 7,927,701 B2 | 4/2011 | Curliss et al. |
| 8,373,971 B2 * | 2/2013 | Young ............................ 361/502 |
| 2002/0035170 A1 | 3/2002 | Glatkowski et al. |
| 2002/0048143 A1 | 4/2002 | Lee et al. |
| 2002/0085968 A1 | 7/2002 | Smalley et al. |
| 2002/0090330 A1 | 7/2002 | Smalley et al. |
| 2002/0098135 A1 | 7/2002 | Smalley et al. |
| 2002/0136683 A1 | 9/2002 | Smalley et al. |
| 2003/0042147 A1 | 3/2003 | Talin et al. |
| 2003/0044678 A1 | 3/2003 | ESq. |
| 2003/0055153 A1 | 3/2003 | Luippold et al. |
| 2003/0102585 A1 | 6/2003 | Poulin et al. |
| 2003/0111333 A1 | 6/2003 | Montgomery et al. |
| 2003/0143453 A1 | 7/2003 | Ren et al. |
| 2004/0007955 A1 | 1/2004 | Yaniv et al. |
| 2004/0018375 A1 | 1/2004 | Banno et al. |
| 2004/0026234 A1 | 2/2004 | Vanden Brande et al. |
| 2004/0071870 A1 | 4/2004 | Knowles et al. |
| 2004/0082247 A1 | 4/2004 | Desai et al. |
| 2004/0096389 A1 | 5/2004 | Lobovsky et al. |
| 2004/0105807 A1 | 6/2004 | Fan et al. |
| 2004/0111141 A1 | 6/2004 | Brabec et al. |
| 2004/0184981 A1 | 9/2004 | Liu et al. |
| 2004/0197546 A1 | 10/2004 | Rinzler et al. |
| 2004/0210289 A1 | 10/2004 | Wang et al. |
| 2004/0241532 A1 | 12/2004 | Kim |
| 2004/0245088 A1 | 12/2004 | Gardner |
| 2004/0253167 A1 | 12/2004 | Silva et al. |
| 2005/0090176 A1 | 4/2005 | Dean et al. |
| 2005/0100501 A1 | 5/2005 | Veedu et al. |
| 2005/0112052 A1 | 5/2005 | Gu et al. |
| 2005/0113876 A1 | 5/2005 | Weiner et al. |
| 2005/0119371 A1 | 6/2005 | Drzal et al. |
| 2005/0170177 A1 | 8/2005 | Crawford et al. |
| 2005/0172370 A1 | 8/2005 | Haq et al. |
| 2005/0176329 A1 | 8/2005 | Olry et al. |
| 2005/0188727 A1 | 9/2005 | Greywall |
| 2005/0214648 A1 | 9/2005 | Boulton et al. |
| 2005/0231893 A1 | 10/2005 | Harvey |
| 2005/0238810 A1 | 10/2005 | Scaringe et al. |
| 2005/0260412 A1 | 11/2005 | Gardner |
| 2005/0263456 A1 | 12/2005 | Cooper et al. |
| 2005/0287064 A1 | 12/2005 | Mayne et al. |
| 2006/0052509 A1 | 3/2006 | Saitoh |
| 2006/0054866 A1 | 3/2006 | Ait-Haddou et al. |
| 2006/0110599 A1 | 5/2006 | Honma et al. |
| 2006/0121275 A1 | 6/2006 | Poulin et al. |
| 2006/0126268 A1 | 6/2006 | Sung |
| 2006/0159916 A1 | 7/2006 | Dubrow et al. |
| 2006/0177602 A1 | 8/2006 | Dijon et al. |
| 2006/0198956 A1 | 9/2006 | Eres |
| 2006/0233692 A1 | 10/2006 | Scaringe et al. |
| 2006/0241236 A1 | 10/2006 | Kuznetsov et al. |
| 2006/0249203 A1 | 11/2006 | Li et al. |
| 2006/0253942 A1 | 11/2006 | Barrera et al. |
| 2007/0020167 A1 | 1/2007 | Han et al. |
| 2007/0036709 A1 | 2/2007 | Lashmore et al. |
| 2007/0048521 A1 | 3/2007 | Istvan |
| 2007/0054105 A1 | 3/2007 | Hsiao |
| 2007/0062799 A1 | 3/2007 | Lee |
| 2007/0070579 A1 | 3/2007 | Sung |
| 2007/0076349 A1 | 4/2007 | Dementiev et al. |
| 2007/0092431 A1 | 4/2007 | Resasco et al. |
| 2007/0110977 A1 | 5/2007 | Al-Haik et al. |
| 2007/0128960 A1 | 6/2007 | Ghasemi Nejhad et al. |
| 2007/0134555 A1 | 6/2007 | Ren et al. |
| 2007/0135588 A1 | 6/2007 | Diakoumakos et al. |
| 2007/0166603 A1 | 7/2007 | Nakanishi et al. |
| 2007/0189953 A1 | 8/2007 | Bai et al. |
| 2007/0237990 A1 | 10/2007 | Kim |
| 2007/0241962 A1 | 10/2007 | Shinoda et al. |
| 2007/0259128 A1 | 11/2007 | Parsapour |
| 2008/0010796 A1 | 1/2008 | Pan et al. |
| 2008/0014431 A1 | 1/2008 | Lashmore et al. |
| 2008/0020193 A1 | 1/2008 | Jang et al. |
| 2008/0048364 A1 | 2/2008 | Armenlades et al. |
| 2008/0049380 A1 | 2/2008 | Miyahara et al. |
| 2008/0053922 A1 | 3/2008 | Honsinger, Jr. et al. |
| 2008/0057265 A1 | 3/2008 | Liang et al. |
| 2008/0063585 A1 | 3/2008 | Smalley |
| 2008/0075954 A1 | 3/2008 | Wardle et al. |
| 2008/0102371 A1 | 5/2008 | Mitchell et al. |
| 2008/0117562 A1 | 5/2008 | Maruyama et al. |
| 2008/0118753 A1 | 5/2008 | Poulin et al. |
| 2008/0137890 A1 | 6/2008 | Petersen et al. |
| 2008/0160286 A1 | 7/2008 | Asrar et al. |
| 2008/0170982 A1 | 7/2008 | Zhang et al. |
| 2008/0173111 A1 | 7/2008 | Thostenson et al. |
| 2008/0182108 A1 | 7/2008 | Curliss et al. |
| 2008/0187482 A1 | 8/2008 | Chen et al. |
| 2008/0187648 A1 | 8/2008 | Hart et al. |
| 2008/0195187 A1 | 8/2008 | Li et al. |
| 2008/0212261 A1 | 9/2008 | Ajayan et al. |
| 2008/0247938 A1 | 10/2008 | Tsai et al. |
| 2008/0248192 A1 * | 10/2008 | Long et al. ....................... 427/80 |
| 2008/0248362 A1 | 10/2008 | Sayre et al. |
| 2008/0251971 A1 | 10/2008 | Kim et al. |
| 2008/0273290 A1 | 11/2008 | Dementiev et al. |
| 2008/0279753 A1 | 11/2008 | Harutyunyan |
| 2008/0286564 A1 | 11/2008 | Tsotsis |
| 2008/0297980 A1 | 12/2008 | Bourcier et al. |
| 2009/0017301 A1 | 1/2009 | Moireau |
| 2009/0020734 A1 | 1/2009 | Jang et al. |
| 2009/0029127 A1 | 1/2009 | Watanabe et al. |
| 2009/0047453 A1 | 2/2009 | Folaron et al. |
| 2009/0047502 A1 | 2/2009 | Folaron et al. |
| 2009/0053512 A1 | 2/2009 | Pyun et al. |
| 2009/0059474 A1 | 3/2009 | Zhamu et al. |
| 2009/0068387 A1 | 3/2009 | Panzer et al. |
| 2009/0068461 A1 | 3/2009 | Reneker et al. |
| 2009/0072222 A1 | 3/2009 | Radisic et al. |
| 2009/0081383 A1 | 3/2009 | Alberding et al. |
| 2009/0081441 A1 | 3/2009 | Shah et al. |
| 2009/0087743 A1 | 4/2009 | Kim et al. |
| 2009/0092832 A1 | 4/2009 | Moireau |
| 2009/0098453 A1 | 4/2009 | Liu et al. |
| 2009/0099016 A1 | 4/2009 | Carruthers et al. |
| 2009/0117269 A1 | 5/2009 | Hansen et al. |
| 2009/0121219 A1 | 5/2009 | Song et al. |
| 2009/0126783 A1 | 5/2009 | Lin et al. |
| 2009/0136707 A1 | 5/2009 | Ueno |
| 2009/0140098 A1 | 6/2009 | Lengsfeld et al. |
| 2009/0176100 A1 | 7/2009 | Higashi et al. |
| 2009/0176112 A1 | 7/2009 | Kruckenberg et al. |
| 2009/0181309 A1 | 7/2009 | Kwon et al. |
| 2009/0185327 A1 | 7/2009 | Seymour |
| 2009/0186214 A1 | 7/2009 | Lafdi et al. |
| 2009/0186276 A1 | 7/2009 | Zhamu et al. |
| 2009/0191352 A1 | 7/2009 | Dufaux et al. |
| 2009/0192241 A1 | 7/2009 | Raravikar et al. |
| 2009/0208743 A1 | 8/2009 | Pettit |

(56) References Cited

U.S. PATENT DOCUMENTS

| | | |
|---|---|---|
| 2009/0212430 A1 | 8/2009 | Wyland |
| 2009/0214800 A1 | 8/2009 | Saito |
| 2009/0220409 A1 | 9/2009 | Curliss et al. |
| 2009/0226673 A1 | 9/2009 | Friedersdorf et al. |
| 2009/0244810 A1 | 10/2009 | Reynolds |
| 2009/0258164 A1 | 10/2009 | Nakai et al. |
| 2009/0262484 A1 | 10/2009 | Miyagi |
| 2009/0272946 A1 | 11/2009 | Lu |
| 2009/0282671 A1 | 11/2009 | Tao et al. |
| 2009/0286079 A1 | 11/2009 | Barker et al. |
| 2009/0294022 A1 | 12/2009 | Hayes et al. |
| 2009/0294753 A1 | 12/2009 | Hauge et al. |
| 2009/0311166 A1 | 12/2009 | Hart et al. |
| 2009/0314510 A1 | 12/2009 | Kukowski et al. |
| 2010/0000520 A1 | 1/2010 | Vachon |
| 2010/0000754 A1 | 1/2010 | Mann et al. |
| 2010/0000770 A1 | 1/2010 | Gupta et al. |
| 2010/0035124 A1 | 2/2010 | Thompson et al. |
| 2010/0059243 A1 | 3/2010 | Chang |
| 2010/0074834 A1 | 3/2010 | Kim |
| 2010/0087042 A1 | 4/2010 | Kim et al. |
| 2010/0098931 A1 | 4/2010 | Daniel et al. |
| 2010/0099319 A1 | 4/2010 | Lashmore et al. |
| 2010/0159240 A1 | 6/2010 | Shah et al. |
| 2010/0173228 A1 | 7/2010 | Wallace et al. |
| 2010/0178825 A1 | 7/2010 | Shah et al. |
| 2010/0188833 A1 | 7/2010 | Liang et al. |
| 2010/0192851 A1 | 8/2010 | Shah et al. |
| 2010/0196697 A1 | 8/2010 | D'Silva et al. |
| 2010/0197848 A1 | 8/2010 | Verghese et al. |
| 2010/0203362 A1 | 8/2010 | Lam et al. |
| 2010/0206504 A1 | 8/2010 | Akiyama et al. |
| 2010/0210159 A1 | 8/2010 | Zhu |
| 2010/0221424 A1 | 9/2010 | Malecki et al. |
| 2010/0224129 A1 | 9/2010 | Malecki et al. |
| 2010/0227134 A1 | 9/2010 | Shah et al. |
| 2010/0227155 A1 | 9/2010 | Bao et al. |
| 2010/0254885 A1 | 10/2010 | Menchhofer et al. |
| 2010/0258111 A1 | 10/2010 | Shah et al. |
| 2010/0270069 A1 | 10/2010 | Shar et al. |
| 2010/0271253 A1 | 10/2010 | Shah et al. |
| 2010/0272891 A1 | 10/2010 | Malecki et al. |
| 2010/0276072 A1 | 11/2010 | Shah et al. |
| 2010/0279569 A1 | 11/2010 | Shah et al. |
| 2010/0311866 A1 | 12/2010 | Huang et al. |
| 2011/0024409 A1 | 2/2011 | Shah et al. |
| 2011/0024694 A1 | 2/2011 | Shah et al. |
| 2011/0036829 A1 | 2/2011 | Fugetsu et al. |
| 2011/0089958 A1 | 4/2011 | Malecki et al. |
| 2011/0123735 A1 | 5/2011 | Shah et al. |
| 2011/0124253 A1 | 5/2011 | Shah et al. |
| 2011/0124483 A1 | 5/2011 | Shah et al. |
| 2011/0143087 A1 | 6/2011 | Alberding et al. |
| 2011/0163274 A1 | 7/2011 | Plee et al. |
| 2011/0171469 A1 | 7/2011 | Shah et al. |
| 2011/0174519 A1 | 7/2011 | Shah et al. |
| 2011/0186775 A1 | 8/2011 | Shah et al. |
| 2011/0216476 A1 | 9/2011 | Fleischer et al. |
| 2011/0235240 A1* | 9/2011 | Lu et al. ............... 361/502 |
| 2011/0242731 A1 | 10/2011 | Fleischer et al. |
| 2011/0281068 A1 | 11/2011 | David et al. |
| 2011/0287318 A1 | 11/2011 | Loveness et al. |
| 2011/0297892 A1 | 12/2011 | Shah et al. |
| 2012/0000691 A1 | 1/2012 | Shah et al. |
| 2012/0052363 A1 | 3/2012 | Fleischer et al. |

FOREIGN PATENT DOCUMENTS

| | | |
|---|---|---|
| CN | 101365740 A | 2/2009 |
| CN | 101698975 | 4/2010 |
| IN | 01900DE2008 A | 3/2010 |
| JP | 2003-239171 A | 8/2003 |
| JP | 2004/247064 A | 9/2004 |
| JP | 2007-246317 A | 9/2007 |
| JP | 2009-535530 A | 10/2009 |
| KR | 100829001 | 5/2008 |
| TW | 200833861 | 8/2008 |
| WO | WO 03082733 | 10/2003 |
| WO | WO 2006/048531 | 5/2006 |
| WO | WO-2006/080702 A1 | 8/2006 |
| WO | WO 2006/115486 | 11/2006 |
| WO | WO 2007/015710 | 2/2007 |
| WO | WO 2007/061854 | 5/2007 |
| WO | WO 2007/089118 | 8/2007 |
| WO | WO 2007/149109 | 12/2007 |
| WO | WO 2008/012196 | 1/2008 |
| WO | WO 2008/041183 | 4/2008 |
| WO | WO 2008/054541 | 5/2008 |
| WO | WO 2008/085634 | 7/2008 |
| WO | WO-2008085550 A2 | 7/2008 |
| WO | WO 2008/115168 | 9/2008 |
| WO | WO 2008/115640 | 9/2008 |
| WO | WO 2008/145787 | 12/2008 |
| WO | WO 2009/004346 | 1/2009 |
| WO | WO 2009110885 | 9/2009 |
| WO | WO-2009/125421 A1 | 10/2009 |

OTHER PUBLICATIONS

U.S. Appl. No. 12/766,817, filed Apr. 23, 2010, Tushar K. Shah.
U.S. Appl. No. 61/295,621, filed Jan. 15, 2010, Harry C. Malecki.
U.S. Appl. No. 61/297,704, filed Jan. 22, 2010, Tushar K. Shah.
Ago, et al., "Colloidal Solution of Metal Nanoparticles as a Catalyst for Carbon Nanotube Growth", Proceedings Materials Research Society, Fall 2000, pp. A13.18.1-A13.18.5, vol. 633, Materials Research Society.
Andrews, et al., "Nanotube Composite Carbon Fibers," Applied Physics Letters, Aug. 1999, vol. 75, No. 9, pp. 1329-1331.
Arepalli, et al., "Carbon-Nanotube-Based Electrochemical Double-Layer Capacitor Technologies for Spaceflight Applications,"JOM, Dec. 2005, pp. 26-31.
Bradford, et al., "Electrical Conductivity Study of Carbon nanotube Yarns, 3-D Hybrid Braids and their Composites", Jouranl of Composite Materials, pp. 1533-1545, vol. 42, No. 15, SAGE Productions, Los Angeles, London, New Delhi and Singapore.
Bubert, et al., "Basic analytical investigation of plasma-chemically modified carbon fibers", Spectrochimica Acta Part B., 2002, pp. 1601-1610, vol. 57, Elsevier Science B.V.
Chae, et al., "A comparison of reinforcement efficiency of various types of carbon nanotubes in polyacrylonitrile fiber", Polymer, Nov. 21, 2005, pp. 10925-10935, vol. 46, No. 24, Elsevier Ltd.
Che, et al., "Chemical Vapor Deposition Based Synthesis of Carbon Nanotubes and Nanofibers Using a Template Method", Chem. Mater., 1998, pp. 260-267, vol. 10, American Chemical Society.
Chen, et al., "Basalt fiber-epoxy laminates with functionalized multi-walled carbon nanotubes", Composites, Part A, 2009, pp. 1082-1089, vol. 40, Elsevier Ltd.
Chen, et al., "Pulsed electrodeposition of Pt nanoclusters on carbon nanotubes modified carbon materials using diffusion restricting viscous electroyles", Electrochemistry Communications, Jun. 2007, pp. 1348-1354, vol. 9, Elsevier B.V.
Ci, et al., "Direct Growth of Carbon Nanotubes on the Surface of Ceramic Fibers", Carbon, 2005, pp. 883-886, vol. 43, No. 4, Elsevier Ltd.
Cui, et al., "Carbon-Silicon Core-Shell Nanowires As High Capacity Electrode for Lithium Ion Batteries," American Chemical Society, vol. xx, No. x.
Fiedler et al, "Can Carbon Nanotubes Be Used to Sense Damage in Composites?", Annales de Chimie—Science des Materiaux, 2004, vol. 29, No. 6, pp. 81-94.
Franz, et al., "Carbon Single-Wall Nanotube Growth in a Volumetrically Confined Arc Discharge System", U.S. Departement of Energy Journal of Undergraduate Research, pp. 66-69, publication date unknown.
Garcia, et al., "Aligned Carbon Nanotube Reinforcement of Advanced Composite Ply Interfaces," 49th AIAA/ASCE/AHS/ASC Structures, Structural Dynamics, and Materials Conference, Apr. 7-10, 2008, Schaumburg, IL, MIT, American Institute of Aeronautics and Astronautics, Inc.

(56) References Cited

OTHER PUBLICATIONS

Hsieh, et al., "Synthesis of Carbon Nanotubes on Carbon Fabric for Use As electrochemical Capacitor," Microporous and Mesoporous Materials, (2009), pp. 155-159, vol. 122.
Hsu, et al., "Optical Absorption and Thermal Transport of Individual Suspended Carbon Nanotube Bundles", Nano Lett., 2009, pp. 590-594, vol. 9, No. 2, American Chemical Society, Publication Date (Web): Jan. 13, 2009.
Jiang, et al., "Carbon nanotube-coated solid-phase microextraction metal fiber based on sol-gel technique", Journal of Chromatography A., May 29, 2009, pp. 4641-4647, vol. 1216, Elsevier B.V.
Jiang, et al., "Plasma-Enhanced Deposition of Silver Nanoparticles onto Polymer and Metal Surfaces for the Generation of Antimicrobial Characteristics", Journal of Applied_Polymer Science, 2004, pp. 1411-1422, vol. 93, Wiley Periodicals, Inc.
Jo, et al., "Field Emission of Carbon Nanotubes Grown on Carbon Cloth," Applied Physics Letters, Aug. 2, 2004, pp. 810-812, vol. 85, No. 5.
Jung, et al., "Fabrication of radar absorbing structure (RAS) using GFR-nano composite and spring-back compensation of hybrid composite RAS shells", Composite Structures, 2006, pp. 571-576, vol. 75, Elsevier Ltd.
Kim, et al., "Processing, characterization, and modeling of carbon nanotube-reinforced multiscale composites," Composites Science and Technology, 2009, pp. 335,342, vol. 69, Elsevier Ltd.
Kind, et al., "Patterned Films of Nanotubes Using Microcontact Printing of Catalysts", Adv. Mater., 1999, pp. 1285-1289, vol. 11, No. 15, WILEY-VCH Verlag GmbH, D-69469 Weinheim.
Kramer, et al., Constrained Iron Catalysts for Single-Walled Carbon Nanotube Growth?, Langmuir 2005, 21, 8466-8470 [http://pubs.acs.org/dol/abs/10.1021/la0506729].
Laachachi, et al., "A chemical method to graft carbon nanotubes onto a carbon fiber", Materials Letters, 2008, pp. 394-397, vol. 62, Elsevier B.V.
Lee, "Syntheses and properties of fluorinated carbon materials", Journal of Fluorine Chemistry, 2007, pp. 392-403, vol. 128, Elsevier B.V.
Lee, et al., "Fabrication and design of multi-layered radar absorbing structures of MWNT-filled glass/epoxy plain-weave composites", Composite Structures, 2006, pp. 397-405, vol. 76, Elsevier Ltd.
Li, et al., "A Miniature glucose/$O_2$ biofuel cell with single-walled carbon nanotubes-modified carbon fiber microelectrodes as the substrate", Electrochemistry Communications, Jun. 2008, pp. 851-854, vol. 10, Elsevier B.V.
Li, et al., "Electromagnetic Interference (EMI) Shielding of Single-Walled Carbon Nanotube Epoxy Composites", Nano Lett., 2006, pp. 1141-1145, vol. 6, No. 6, American Chemical Society.
Makris, et al., "Carbon Nanotubes Growth and Anchorage to Carbon Fibres", Carbon Nanotubes, 2006, pp. 57-58, vol. 222, Springer, the Netherlands.
Meyyappan, et al., "Carbon nanotube growth by PECVD: a review", Plasma Sources Sci. Technol., 2003, pp. 205-216, vol. 12, IOP Publishing Ltd, UK.
Mylvaganam, "Fabrication and Application of Polymer Composites Comprising Carbon Nanotubes", Recent Pat Nanotechnol., 2007, pp. 59-65, vol. 1, Bentham Science Publishers, Ltd.
Panhuis, et al., "Carbon Nanotube Mediated Reduction in Optical Activity in Polyaniline Composite Materials", J. Phys. Chem. C, 2008, pp. 1441-1445, vol. 112, American Chemical Society.
Parrish, "Carbon Nanotubes and Carbon Layer Nanostructured Composites Grown in Improved Process," Capella University, Before It's News, Jul. 9, 2010.
Pisco, et al., "Hollow fibers integrated with single walled carbon nanotubes: Bandgap modification and chemical sensing capability", Sensors and Actuators B, 2008, pp. 163-170, vol. 129, Elsevier B.V.
Račkauskas "Carbon nanotube growth and use in energy sector", Energetika, 2006, pp. 43-46, vol. 2.
Satishkumar, et al., "Bundles of aligned carbon nanotubes obtained by the pyrolysis of ferrocene-hydrocarbon mixtures: role of the metal nanoparticles produced in situ", Chemical Physics Letters, 1999, pp. 158-162, vol. 307, Elsevier Science B.V.
Suh, et al., "Highly ordered two-dimensional carbon nanotube arrays", Applied Physics Letters, Oct. 4, 2002, pp. 2047-2049, vol. 75, No. 14, American Institute of Physics.
Thostenson et al., "Carbon Nanotube Networks: Sensing of distributed Strain and Damage for Life Prediction and Self Healing," Advanced Materials, Oct. 2, 1006, vol. 18, Iss. 21, pp. 2837-2841.
Wang, et al., "Penetration depth of atmospheric pressure plasma surface modification into multiple layers of polyester fabrics", Surface and Coatings Technology, 2007, pp. 77-83, vol. 202, Elsevier B.V.
Wang, et al., "Processing and property investigation of single-walled carbon nanotube (SWNT) buckypaper/epoxy resin matrix nanocomposites", Composites: Part A, 2004, pp. 1225-1232, vol. 35, Elsevier Ltd.
Wichmann, et al., "Glass-fibre-reinforced composites with enhanced mechanical and electrical properties—Benefits and limitations of a nanoparticle modified matrix", Engineering Fracture Mechanics, 2006, pp. 2346-2359, vol. 73, Elsevier Ltd.
Xu, et al., "Bone-Shaped Nanomaterials for Nanocomposite Applications", Nano Lett., 2003, pp. 1135-1139, vol. 3, No. 8, American Chemical Society.
Yabe, et al., Synthesis of well-aligned carbon nanotubes by radio frequency plasma enhanced CVD method, Diamond and Related Materials, 2004, pp. 1292-1295, vol. 13, Elsevier B.V.
Yanagishita, et al., "Carbon Nanotubes with a Triangular Cross-section, Fabricated Using Anodic Porous Alumina as the Temple", Adv. Mater., 204, pp. 429-432, vol. 16, No. 5, WILEY-VCH Verlag GmbH & Co. KGaA, Weinheim.
Yang, et al., "Electrical Conductivity and Electromagnetic Interference Shielding of Multi-walled Carbon Nanotube Filled Polymer Composites" Mater. Res. Soc. Symp. Proc., 2005, pp. HH5.3.1-HH. 5.3.5, vol. 858E, Materials Research Society.
Yeh, et al., "Mechanical properties of phenolic-based nanocomposites reinforced by multi-walled carbon nanotubes and carbon fibers", Composites: Part A, 2008, pp. 677-684, vol. 39, No. 4.
Zhang et al., "Integration and characterization of aligned carbon nanotubes on metal/silicon substrates and effects of water", Applied Surface Science 255 (2009) 5003-5008, entire document.
Zhang, et al., "In situ growth of carbon nanotubes on inorganic fibers with different surface properties," Materials Chemistry and Physics, 2008, pp. 317-321, vol. 107, Science Direct.
Zhao et al., "The Use of Carbon Nanotubes to Sense Matrix Stresses Around a Single Glass Fiber," Composites Science and Technology, Nov. 2001, vol. 61, No. 14, pp. 2139-2143.
Zhao, et al., "Carbon Nanosheets As the Electrode Material in Supercapacitors," Journal of Power Sources 194 (2009 pp. 1208-1212.
Zhao, et al., "Growth of carbon nanotubes on the surface of carbon fibers", Carbon, 2007, pp. 380-383, vol. 46, No. 2, Elsevier Ltd.
Zhao, et al., "The growth of multi-walled carbon nanotubes with different morphologies on carbon fibers", Carbon, 2005, pp. 651-673, vol. 43, Elsevier Ltd.
Zhu, et al., "Carbon nanotube growth on carbon fibers", Diamond and Related Materials, 2003, pp. 1825-1825, vol. 12, Elsevier B.V.
Zhu, et al., "Synthesis of single-walled carbon nanotubes by the vertical floating catalyst method," Chinese Science Bulletin, 2002, pp. 159-162, vol. 47, No. 2.
Garcia, et al., "Fabrication and multifunctional properties of a hybrid laminate with aligned carbon nanotubes grown in Situ", Composites Science and Technology, Jul. 1, 2008, pp. 2034-2041, vol. 68, No. 9.
Hou et al., "A resistance-based damage location sensor for carbon-fibre composites", Smart Materials and Structures, Nov. 4, 2002, vol. 11, pp. 966-969.
Thostenson et al., "Real-time in situ sensing of damage evolution in advanced fiber composites using carbon nanotube networks", Nanotechnology, Apr. 23, 2003, vol. 19.

* cited by examiner

ELECTRICAL DEVICES CONTAINING CARBON NANOTUBE-INFUSED FIBERS AND METHODS FOR PRODUCTION THEREOF

CROSS-REFERENCE TO RELATED APPLICATIONS

This application claims the benefit of priority under 35 U.S.C. §119 from U.S. Provisional Patent Application Ser. No. 61/355,097, filed Jun. 15, 2010, which is incorporated herein by reference in its entirety.

STATEMENT REGARDING FEDERALLY SPONSORED RESEARCH OR DEVELOPMENT

Not applicable.

FIELD OF THE INVENTION

The present invention generally relates to energy storage, and, more specifically, energy storage using carbon nanotubes.

BACKGROUND

Capacitors are electrical devices that are used to accumulate and store electric charge. Capacitors are distinguished from batteries in at least two aspects. First, storage of electric charge in capacitors is based upon physical charge separation rather than the chemical separation of batteries. Second, charge and discharge rates of capacitors are much more rapid than the chemical reactions that occur in batteries.

In conventional capacitors, charge separation is maintained by two conductive plates that are separated by a dielectric material. In the presence of an applied potential, an electric field builds in the dielectric material and produces a mechanical force between the conductive plates. The ratio of the electric charge maintained on the conductive plates to the potential difference between them is referred to as the capacitance, which is measured in Farads.

Various modifications of conventional capacitors have also been developed. Electrolytic capacitors utilize an ion-containing liquid as one of its conductive plates. Such electrolytic capacitors typically display much higher capacitance values than do conventional capacitors. However, their utility is somewhat limited by a requirement that each conductive plate is to be maintained in a polarized voltage state.

Supercapacitors, also known as electric double-layer capacitors, electrochemical double-layer capacitors, supercondensors, ultracapacitors, or pseudocapacitors, can display even higher capacitance values. Supercapacitors differ significantly from conventional capacitors and electrolytic capacitors in that there is not a significant physical separation of the conductive plates in a supercapacitor. Instead, supercapacitors maintain charge separation by incorporating a vanishingly thin physical barrier between the conductive plates (<100 μm). The physical barrier effectively maintains charge separation when the supercapacitor is in the charged state, while being sufficiently permeable to charge carriers to allow rapid charge and discharge rates.

Many conventional supercapacitors presently use activated carbon particles as a high surface area substrate to hold charge carriers from an electrolyte dispersed therein. Although activated carbon particles have a high surface area, certain charge carriers are too large to penetrate the porous interior of the activated carbon particles and take advantage of its high surface area. Further, activated carbon is fairly non-compressible, and the volume of conventional supercapacitors containing a given quantity of activated carbon cannot typically be significantly reduced by compression.

FIG. 1 shows a schematic of an illustrative prior art supercapacitor 100 containing activated carbon particles 105. Supercapacitor 100 contains conductive layers 101 and 102, connected to positive terminal 103 and negative terminal 104, respectively. Conductive layers 101 and 102 each contain activated carbon particles 105 and an electrolyte containing positive ions 106 and negative ions 107 admixed with activated carbon particles 105. Positive ions 106 and negative ions 107 can reside about the interior or exterior of activated carbon particles 105. Conductive layers 101 and 102 are physically isolated from one another by a layer of separator material 108, which is permeable to positive ions 106 and negative ions 107 of the electrolyte. As shown in FIG. 1, supercapacitor 100 is in a discharged state.

Certain high performance materials, including carbon nanotubes, have been proposed as a replacement for activated carbon particles in supercapacitors due their high accessible surface area. Carbon nanotubes can be further advantageous in this regard due to their electrical conductivity. Although carbon nanotubes offer significant potential for improving the electrical performance of supercapacitors, research efforts to date have only been successful in randomly dispersing small quantities of carbon nanotubes in the electrolyte medium of a supercapacitor. As such, current fabrication techniques have only been amenable to production of small carbon nanotube-containing supercapacitors with low electrical storage capabilities.

In view of the foregoing, high-volume supercapacitors and other electrical devices containing large quantities of carbon nanotubes would represent a significant advance in the art. It would also be of considerable benefit to provide methods for readily preparing such high-volume supercapacitors and other electrical devices. The present invention satisfies these needs and provides related advantages as well.

SUMMARY

In some embodiments, electrical devices described herein contain a plurality of stacked electrode layers, where each electrode layer contains continuous fibers that are infused with carbon nanotubes.

In other embodiments, electrical devices described herein contain a plurality of stacked electrode layers, where each electrode layer contains an electrically conductive base plate and continuous fibers that are infused with carbon nanotubes and disposed about the electrically conductive base plate. The continuous fibers further contain a coating deposited on at least a portion of the infused carbon nanotubes.

In still other embodiments, electrical devices described herein contain a plurality of stacked electrode layers, where at least one electrode layer contains continuous fibers that are infused with carbon nanotubes.

In other various embodiments, methods for forming electrical devices are described herein. The methods include forming an electrode layer by disposing continuous fibers that are infused with carbon nanotubes about an electrically conductive base plate, and stacking a plurality of the electrode layers upon one another. Each electrode layer is separated by a layer of separator material.

The foregoing has outlined rather broadly the features of the present disclosure in order that the detailed description that follows can be better understood. Additional features and advantages of the disclosure will be described hereinafter, which form the subject of the claims.

BRIEF DESCRIPTION OF THE DRAWINGS

For a more complete understanding of the present disclosure, and the advantages thereof, reference is now made to the following descriptions to be taken in conjunction with the accompanying drawings describing a specific embodiments of the disclosure, wherein.

DETAILED DESCRIPTION

Figure 1:
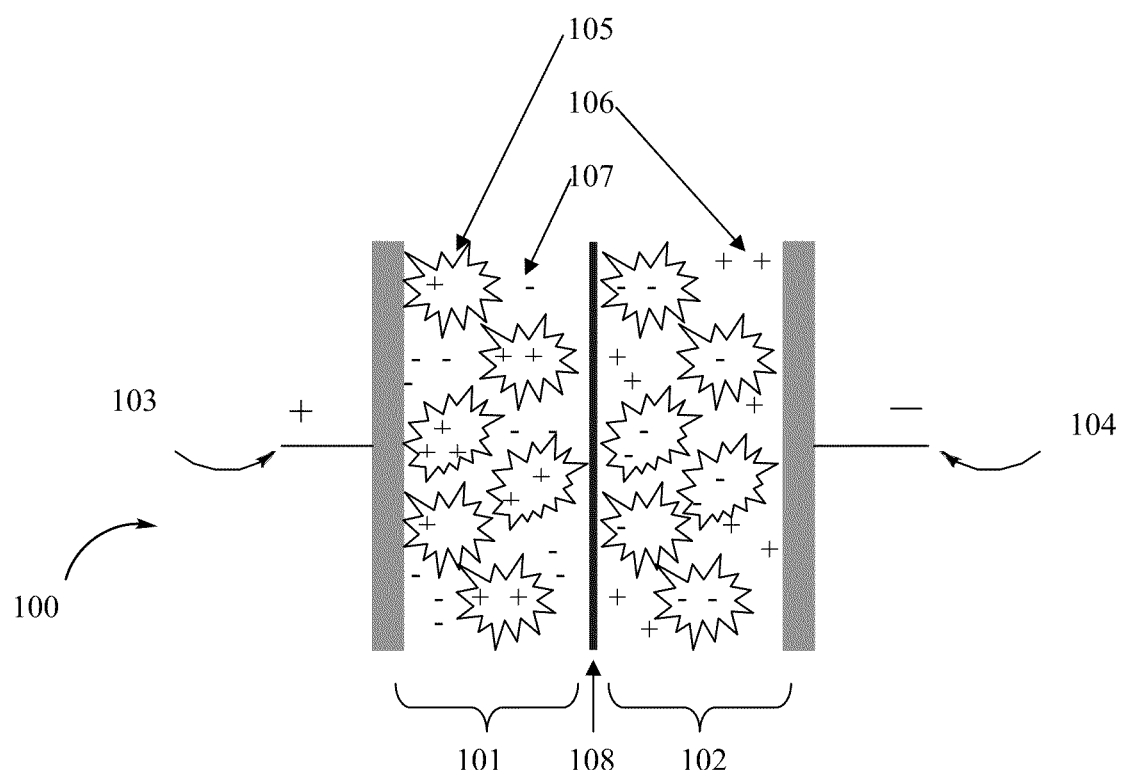
FIG. 1 shows a schematic of an illustrative prior art supercapacitor containing activated carbon particles.

The present disclosure is directed, in part, to electrical devices having electrode layers that contain continuous fibers that are infused with carbon nanotubes. Such continuous fibers are synonymously referred to herein as carbon nanotube-infused fibers or carbon nanotube-infused fiber materials. The present disclosure is also directed, in part, to methods for making such electrical devices. Despite their promise in electrical device applications, including supercapacitor applications, it has heretofore been difficult to place carbon nanotubes into electrical devices in a state that can take advantage of their exceedingly high effective surface area.

As previously described, supercapacitors typically display much higher capacitance values than do conventional capacitors or electrolytic capacitors. Accordingly, they have garnered significant interest in energy storage applications such as, for example, solar energy collection, hydroelectric energy collection, wind farm energy collection, and the like. The rapid charge and discharge cycles of supercapacitors make these electrical devices particularly well suited for the foregoing purposes and others, since supercapacitors can readily take on excess energy when electrical grid demand is low and quickly release their stored energy when electrical grid demand is high. Further, supercapacitors can be non-degradably charged and discharged many hundreds of thousands of times, making them considerably superior to batteries in this regard. In addition, the rapid charge/discharge cycles of supercapacitors and their charge/discharge stability make these electrical devices especially useful for applications in which multiple cycles of rapid charging and discharging are desirable such as, for example, in hybrid gas-electric vehicles.

With growing interest in the above applications and others, supercapacitors that have even higher energy storage limits than those currently available are needed. The capacitance in supercapacitors is proportional to the total electrode surface area (e.g., the area of all conductive plates). In conventional supercapacitors containing activated carbon particles, there is an intrinsic limit as to how much the effective electrode surface area can be increased. That is, the activated carbon particles used in conventional supercapacitors can only be made so small before an asymptotic capacitance value is reached. Further, limited pore sizes in the activated carbon particles reduce their effective surface area and can be problematic for some electrolytes. Because carbon nanotubes provide a significantly higher effective surface area per unit weight than does activated carbon, these entities offer the potential to significantly increase the capacitance of supercapacitors having an electrode footprint of a given size. In addition, the intrinsic electrical conductivity of carbon nanotubes offers particular advantages over activated carbon particles in providing greater charge/discharge rates and increased energy storage density in a supercapacitor.

Embodiments described herein contain electrode layers that are made from continuous fibers that have been infused with carbon nanotubes. Such continuous carbon nanotube-infused fibers are described in commonly assigned, co-pending U.S. patent application Ser. Nos. 12/611,073, 12/611,101, and 12/611,103, all filed on Nov. 2, 2009, and Ser. No. 12/938,328, filed on Nov. 2, 2010, each of which is incorporated herein by reference in its entirety. The fiber material of such carbon nanotube-infused fibers can generally vary without limitation and can include, for example, glass fibers, carbon fibers, metal fibers, ceramic fibers, and organic fibers (e.g., aramid fibers) for example. Such carbon nanotube-infused fibers can be readily prepared in spoolable lengths from commercially available continuous fibers or continuous fiber forms (e.g., fiber tows or fiber tapes). In addition, the carbon nanotubes' lengths, diameters, and coverage density can readily be varied by the above-referenced methods.

Depending on their growth conditions and subsequent processing, the carbon nanotubes of the carbon nanotube-infused fibers can also be oriented such that they are substantially perpendicular to the surface of the fiber material or such that they are substantially parallel to the longitudinal axis of the fiber material. In the present embodiments, by using carbon nanotube-infused fibers having substantially perpendicular carbon nanotubes, a better presentation of the carbon nanotube surface area can be realized (e.g., to an electrolyte). This is particularly true when the carbon nanotubes are present in a substantially unbundled state. The above-referenced methods for preparing carbon nanotube-infused fibers are particularly adept at achieving a substantially perpendicular orientation and a substantially unbundled state, thereby providing carbon nanotube-infused fibers having a high effective surface area for use in the present embodiments. Additional details concerning the carbon nanotube-infused fibers and methods for production thereof are set forth hereinafter.

Supercapacitors and like electrical devices containing continuous carbon nanotube-infused fibers have been described in co-pending and commonly owned U.S. patent application Ser. Nos. 13/039,025 and 13/039,028, each filed on Mar. 2, 2011 and incorporated herein by reference in its entirety. Embodiments described herein represent particular refinements and/or modifications of the electrical devices described in these co-pending patent applications. In particular, embodiments described herein contain electrode layers that are stacked upon one another, whereas the supercapacitors and like electrical devices described in the above applications contain electrode layers that are disposed about a central axis, rather than being oriented in a stacked configuration.

The activated carbon materials that are used in conventional supercapacitors are not particularly compressible. In contrast, carbon nanotube-infused fibers, which are described in more detail hereinbelow, demonstrate a considerable degree of compressibility. Therefore, a supercapacitor or like electrical device containing carbon nanotube-infused fibers can have its volume reduced significantly by compression, while still maintaining a like weight of carbon nanotube-infused fibers and demonstrating better electrical properties per unit volume as a result. As a further advantage, carbon nanotube-infused fibers can be made at a lower cost per unit weight than can the activated carbon materials presently used in supercapacitors, thereby allowing a supercapacitor with a higher capacitance per unit cost to be prepared.

As alluded to above, a particularly beneficial feature of the electrical devices described herein is that their electrode layers are readily compressible after being stacked together. By compressing the stacked electrode layers, their volume can be reduced by as much as about 50%, thereby providing an increased charge storage capacity for a given weight of carbon nanotube-infused fibers. In addition, by compressing the electrode layers, a smaller volume of electrolyte can be used in embodiments of the electrical devices in which an electrolyte is employed (e.g., in a supercapacitor). In contrast, the electrical devices described in the above-referenced patent applications are not particularly compressible due to the propensity of their electrode layers to buckle when compressed.

In addition to the foregoing design advantages of the present electrical devices, it has been surprisingly discovered that certain materials can be used to at least partially coat the infused carbon nanotubes and markedly increase the operational efficiency of the electrical devices. Specifically, it has been discovered that when the infused carbon nanotubes of the present electrical devices are at least partially coated with certain conducting polymers, main group metal compounds, and/or transition metal compounds, significantly higher capacitance values can be realized. Additional disclosure concerning such coatings and processes for producing them are set forth in detail hereinafter.

As used herein, the term "substantially planar" refers to an electrode layer surface that is macroscopically flat.

As used herein, the terms "fiber," "fiber material," or "filament" equivalently refer to any material that has a fibrous component as a basic structural feature. As used herein, the term "continuous fibers" refers to spoolable lengths of fiber materials such as individual filaments, yarns, rovings, tows, tapes, ribbons, woven and non-woven fabrics, plies, mats, and the like.

As used herein, the terms "spoolable lengths" or "spoolable dimensions" equivalently refer to a fiber material that has at least one dimension that is not limited in length, thereby allowing the fiber material to be stored on a spool or mandrel following infusion with carbon nanotubes. A fiber material of "spoolable lengths" or "spoolable dimensions" has at least one dimension that indicates the use of either batch or continuous processing for carbon nanotube infusion thereon.

As used herein, the term "infused" refers to being bonded and "infusion" refers to the process of bonding. As used herein, the terms "carbon nanotube-infused fiber," "carbon nanotube-infused fiber material," or "fibers that are infused with carbon nanotubes" equivalently refer to a fiber material that has carbon nanotubes bonded thereto. Such bonding of carbon nanotubes to a fiber material can involve mechanical attachment, covalent bonding, ionic bonding, pi-pi interactions (pi-stacking interactions), and/or van der Waals force-mediated physisorption. In some embodiments, the carbon nanotubes can be directly bonded to the fiber material. In other embodiments, the carbon nanotubes can be indirectly bonded to the fiber material via a barrier coating and/or catalytic nanoparticles used to mediate growth of the carbon nanotubes. The particular manner in which the carbon nanotubes are infused to the fiber material can be referred to as the bonding motif.

As used herein, the term "nanoparticle" refers to particles having a diameter between about 0.1 nm and about 100 nm in equivalent spherical diameter, although nanoparticles need not necessarily be spherical in shape. As used herein, the term "catalytic nanoparticle" refers to a nanoparticle that possesses catalytic activity for mediating carbon nanotube growth.

As used herein, the term "transition metal" refers to any element or alloy of elements in the d-block of the periodic table (Groups 3 through 12), and the term "transition metal salt" refers to any transition metal compound such as, for example, transition metal oxides, carbides, nitrides, nitrates, sulfides, sulfates, phosphates, halides (e.g., fluorides, chlorides, bromides, and iodides), and the like. Illustrative transition metals that form catalytic nanoparticles suitable for synthesizing carbon nanotubes include, for example, Ni, Fe, Co, Mo, Cu, Pt, Au, Ag, alloys thereof, salts thereof, and mixtures thereof. As used herein, the term "high oxidation state transition metal compound" refers to any transition metal compound having an element from Groups 3 through 12 of the periodic table in which the oxidation state of the transition metal is +2 or greater. In some embodiments, the high oxidation state transition metal compound can be a transition metal oxide or a complex ion containing a high oxidation state transition metal (e.g., $MnO_4^-$).

As used herein, the term "main group metal" refers to any metal in the s-block or the p-block of the periodic table (Groups 1-2 and 13-18, respectively). Illustrative "main group metal compounds," particularly "main group metal salts," can include main group metal oxides, carbides, nitrides, nitrates, sulfides, sulfates, phosphates, halides (e.g., fluorides, chlorides, bromides, and iodides), and the like.

As used herein, the terms "sizing agent," or "sizing," collectively refer to materials used in the manufacture of fiber materials as a coating to protect the integrity of the fiber material, to provide enhanced interfacial interactions between the fiber material and a matrix material, and/or to alter and/or to enhance certain physical properties of the fiber material.

As used herein, the term "uniform in length" refers to a condition in which carbon nanotubes have lengths with tolerances of plus or minus about 20% or less of the total carbon nanotube length, for carbon nanotube lengths ranging from about 1 µm to about 500 µm. At very short carbon nanotube lengths (e.g., about 1 µm to about 4 µm), the tolerance can be plus or minus about 1 µm, that is, somewhat more than about 20% of the total carbon nanotube length.

As used herein, the term "uniform in density distribution" refers to a condition in which the carbon nanotube coverage density on a fiber material has a tolerance of plus or minus about 10% over the fiber material surface area that is covered with carbon nanotubes.

In some embodiments, electrical devices described herein contain a plurality of stacked electrode layers, where each electrode layer contains continuous fibers that are infused with carbon nanotubes. In some embodiments, the electrode layers can be substantially planar.

The types of carbon nanotubes infused to the continuous fibers can generally vary without limitation. In various embodiments, the carbon nanotubes infused to the continuous fibers can be, for example, any of a number of cylindrically-shaped carbon allotropes of the fullerene family including single-wall carbon nanotubes, double-wall carbon nanotubes, multi-wall carbon nanotubes, and any combination thereof. In some embodiments, the carbon nanotubes can be capped with a fullerene-like structure. Stated another way, the carbon nanotubes have closed ends in such embodiments.

However, in other embodiments, the carbon nanotubes can remain open-ended. In some embodiments, closed carbon nanotube ends can be opened through treatment with an appropriate oxidizing agent (e.g., $HNO_3/H_2SO_4$). In some embodiments, the carbon nanotubes can encapsulate other materials. In some embodiments, the carbon nanotubes can be covalently functionalized after becoming infused to the fiber material. In some embodiments, a plasma process can be used to promote functionalization of the carbon nanotubes. In some embodiments, the carbon nanotubes can be at least partially coated with another material when infused to the continuous fibers.

Carbon nanotubes can be metallic, semimetallic or semiconducting depending on their chirality. An established system of nomenclature for designating a carbon nanotube's chirality is recognized by one of ordinary skill in the art and is distinguished by a double index (n,m), where n and m are integers that describe the cut and wrapping of hexagonal graphite when formed into a tubular structure. In addition to chirality, a carbon nanotube's diameter also influences its electrical conductivity and the related property of thermal conductivity. In the synthesis of carbon nanotubes, the carbon nanotubes' diameters can be controlled by using catalytic nanoparticles of a given size. Typically, a carbon nanotube's diameter is approximately that of the catalytic nanoparticle that catalyzes its formation. Therefore, carbon nanotubes' properties can be controlled in one respect by adjusting the size of the catalytic nanoparticles used in their synthesis, for example. By way of non-limiting example, catalytic nanoparticles having a diameter of about 1 nm can be used to infuse a fiber material with single-wall carbon nanotubes. Larger catalytic nanoparticles can be used to prepare predominantly multi-wall carbon nanotubes, which have larger diameters because of their multiple nanotube layers, or mixtures of single-wall and multi-wall carbon nanotubes. Multi-wall carbon nanotubes typically have a more complex conductivity profile than do single-wall carbon nanotubes due to interwall reactions that can occur between the individual nanotube layers and redistribute current non-uniformly. By contrast, there is no change in current across different portions of a single-wall carbon nanotube.

In general, the carbon nanotubes infused to the continuous fibers can be of any length. Longer carbon nanotubes are generally more advantageous in the present embodiments, since they can provide electrodes having a higher effective surface area. In various embodiments, the carbon nanotubes can have a length ranging between about 1 µm and about 1000 µm or between about 1 µm and about 500 µm. In some embodiments, the carbon nanotubes can have a length ranging between about 100 µm and about 500 µm. In other embodiments, the carbon nanotubes can have a length ranging between about 1 µm and about 50 µm or between about 10 µm and about 25 µm. In some embodiments, the carbon nanotubes can be substantially uniform in length.

In some embodiments, an average length of the carbon nanotubes can range between about 1 µm and about 500 µm, including about 1 µm, about 2 µm, about 3 µm, about 4 µm, about 5 µm, about 6 µm, about 7 µm, about 8 µm, about 9 µm, about 10 µm, about 15 µm, about 20 µm, about 25 µm, about 30 µm, about 35 µm, about 40 µm, about 45 µm, about 50 µm, about 60 µm, about 70 µm, about 80 µm, about 90 µm, about 100 µm, about 150 µm, about 200 µm, about 250 µm, about 300 µm, about 350 µm, about 400 µm, about 450 µm, about 500 µm, and all values and subranges therebetween. In some embodiments, an average length of the carbon nanotubes can be less than about 1 µm, including about 0.5 µm, for example, and all values and subranges therebetween. In some embodiments, an average length of the carbon nanotubes can range between about 1 µm and about 10 µm, including, for example, about 1 µm, about 2 µm, about 3 µm, about 4 µm, about 5 µm, about 6 µm, about 7 µm, about 8 µm, about 9 µm, about 10 µm, and all values and subranges therebetween. In still other embodiments, an average length of the carbon nanotubes can be greater than about 500 µm, including, for example, about 510 µm, about 520 µm, about 550 µm, about 600 µm, about 700 µm, and all values and subranges therebetween.

The average length of the carbon nanotubes can be one factor that determines the weight percentage of carbon nanotubes infused to the continuous fiber. In general, the carbon nanotube-infused fibers described in the above-referenced, co-pending patent applications have much higher carbon nanotube loading percentages than can be obtained by other methods. For example, carbon nanotube-infused fibers can contain between about 1% to about 30% or even about 40% to about 50% infused carbon nanotubes by weight. In the present embodiments, the chosen carbon nanotube weight percentage can be dictated by a desired electrical property (e.g., a desired capacitance for a supercapacitor).

The carbon nanotube coverage density on the continuous fibers can be another factor that determines the weight percentage of infused carbon nanotubes. In some embodiments, the carbon nanotubes infused to the fiber material are generally uniform in density distribution, referring to the uniformity of the carbon nanotube density that is infused to the fiber material. As defined above, the tolerance for a uniform density distribution is plus or minus about 10% over the fiber material surface area that is infused with carbon nanotubes. By way of non-limiting example, this tolerance is equivalent to about ±1500 carbon nanotubes/µm$^2$ for a carbon nanotube having a diameter of 8 nm and 5 walls. Such a figure assumes that the space inside the carbon nanotube is fillable. In some embodiments, the maximum carbon nanotube density, expressed as a percent coverage of the fiber material (i.e., the percentage of the fiber material surface area that is covered with carbon nanotubes) can be as high as about 55%, again assuming a carbon nanotube having an 8 nm diameter, 5 walls and fillable space within. 55% surface area coverage is equivalent to about 15,000 carbon nanotubes/µm$^2$ for a carbon nanotube having the referenced dimensions. In some embodiments, the density of coverage is up to about 15,000 carbon nanotubes/µm$^2$. One of ordinary skill in the art will recognize that a wide range of carbon nanotube density distributions can be attained by varying the disposition of the catalytic nanoparticles on the surface of the fiber material, the exposure time of the fiber material to carbon nanotube growth conditions, and the actual growth conditions themselves used to infuse the carbon nanotubes to the fiber material.

In some embodiments, the density of carbon nanotube coverage on the continuous fibers can be adjusted to account for the size of electrolyte ions to which the electrode layers are exposed. For example, if an electrolyte used in conjunction with the present embodiments contains larger ions, a lower density of carbon nanotube coverage on the continuous fibers can be used to ensure satisfactory ion mobility and electrode contact during charge and discharge cycles.

Figure 2:
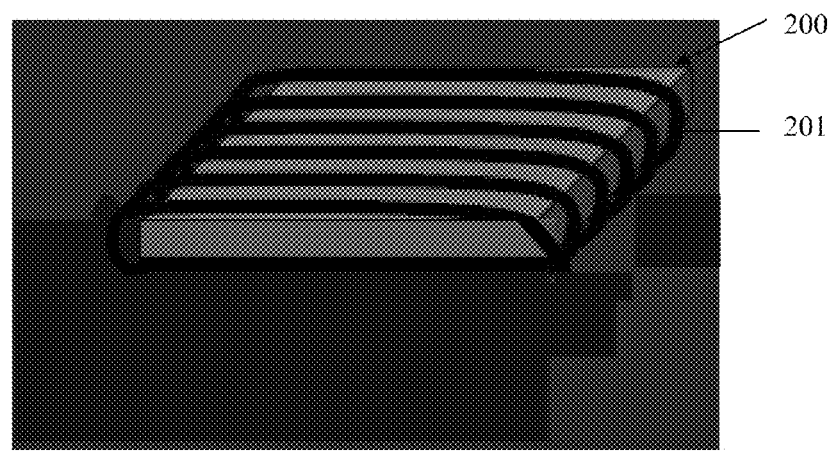
FIG. 2 shows an isometric schematic of an illustrative electrode layer containing carbon nanotube-infused fibers.

In accordance with some of the present embodiments, continuous fibers that are infused with carbon nanotubes can be used to form an electrode layer. In some embodiments, the electrode layer can be formed by disposing the continuous fibers about a base plate, particularly an electrically conductive base plate FIG. 2 shows an isometric schematic of an illustrative electrode layer containing carbon nanotube-infused fibers. As shown in FIG. 2, continuous fiber 201 is conformally wound about base plate 200 to form an electrode layer. Multiple electrode layers can be stacked together and electrically isolated from adjacent layers in order to form an electrical device according to the present embodiments (see FIGS. 3, 4A and 4B). Although FIG. 2 has shown spacing between adjacent windings of continuous fiber 201 about base plate 200, it is to be understood that the spacing depicted is for purposes of illustration clarity only. As will be evident to one of ordinary skill in the art, by having adjacent windings of continuous fiber 201 as closely spaced as possible about base plate 200, a larger number of carbon nanotubes per unit area can be obtained, thereby leading to higher electrode layer surface areas and a higher energy density per unit weight of continuous fiber. It should be noted, however, that the spacing between adjacent windings of continuous fiber 201 can be varied, if needed, to vary the electrical properties of the electrical devices of the present embodiments (e.g., to provide a desired capacitance in a supercapacitor of a given size). Although not precluded in the present embodiments, it is generally the case that there is substantially no overlap between adjacent windings of continuous fiber 201, as this would produce an electrode layer having a smaller surface area per unit weight of continuous fiber. It should be noted that some contact between individual continuous fibers in higher order continuous fiber structures (e.g., fiber tows, fiber ribbons, fiber tapes, and/or the like) can be tolerated as long as an electrolyte has sufficient access to the surface area of the individual continuous fibers and carbon nanotubes infused thereto.

The identity of the base plate of the electrode layer is not particularly limited. In some embodiments, the base plate can be an electrically conductive material. Suitable electrically conductive materials can include metals such as, for example, aluminum. In such embodiments, the electrical conductivity of the infused carbon nanotubes can supplement the electrical conductivity of the base plate. In such embodiments, the charge/discharge rates and electrical conductivities of the electrical devices can be desirably high.

The dimensions of the base plate are not particularly limited, except that the base plate should be mechanically stable when incorporated into an electrical device, particularly an electrical device in which multiple electrode layers are stacked upon one another. Ultimately, the size of the base plate determines the surface area of the electrode layers, which can impact numerous electrical properties such as, for example, electrical conductivity and capacitance. Depending on the desired application, including any operational size restrictions and/or performance requirements, the base plate can have a surface area ranging in size from about 1 cm$^2$ to about 100,000 cm$^2$. In some embodiments, the base plate is thin (e.g., a pseudo-two dimensional structure), such that at least the majority of its surface area is determined by the combined area of its top and bottom faces. For example, in some embodiments, the base plate can have a thickness such that greater than about 95% of its surface area resides on its top and bottom faces. In other embodiments, the base plate can be a true three dimensional solid, such that less than about 95% of its surface area resides on its top and bottom faces. That is, in such embodiments, the base plate has a "height." Illustrative shapes of the base plate can include, for example, triangular prisms, rectangular prisms, square prisms, rhombic prisms, trapezoidal prisms, pentagonal prisms, hexagonal prisms, heptagonal prisms, octagonal prisms, nonagonal prisms, decagonal prisms, and the like.

In general, any type of continuous fibers that can infused with carbon nanotubes can be used in the present embodiments. As described above, continuous fibers such as, for example, glass fibers, carbon fibers, metal fibers, ceramic fibers, and organic fibers can be successfully infused with carbon nanotubes. Accordingly, any of these fiber types can be used in the present embodiments. Additional details concerning carbon nanotube-infused fibers and methods for their production are set forth hereinbelow.

In various embodiments, individual continuous fibers (i.e., individual filaments) have a diameter ranging between about 1 µm and about 100 µm. Continuous length fibers having diameters in this range are readily available from a variety of commercial sources.

In some embodiments, the carbon nanotubes infused to the continuous fibers can be substantially perpendicular to the surface of the continuous fibers. Although carbon nanotube-infused fibers can be produced such that they have the infused carbon nanotubes present in any desired orientation, one of ordinary skill in the art will recognize that a substantially perpendicular orientation will maximize the exposed carbon nanotube surface area and, hence, the electrode layer surface area. For at least this reason, a substantially perpendicular orientation of the carbon nanotubes is advantageous in the present embodiments. It should be noted, however, that carbon nanotube orientations other than substantially perpendicular are not precluded from being used in the present embodiments.

In some embodiments, the continuous fibers can be electrically conductive before being infused with carbon nanotubes. Illustrative conductive fibers that can be used in the present embodiments include, for example, carbon fibers and metal fibers (e.g., stainless steel, aluminum, copper and the like). Although carbon nanotube infusion to the continuous fibers imparts electrical conductivity thereto, better charge/discharge rates and charge storage properties are generally observed when the continuous fibers are initially electrically conductive before carbon nanotube infusion. In alternative embodiments, however, the continuous fibers can be non-conductive before being infused with carbon nanotubes.

In general, the continuous fibers are used in a higher order fiber form in the present embodiments, rather than being placed in the electrode layer as individual filaments. Such higher order fiber forms vary widely in structure and are considered in further detail immediately hereinafter. In some embodiments, the fiber form of the continuous fibers can be, for example, a fiber tow, a fiber tape, and/or a fiber ribbon. In other embodiments, the fiber form can be, for example, a fiber roving, a yarn, a fiber braid, a woven or non-woven fabric, a fiber ply, and/or a fiber mat.

Rovings include soft strands of continuous fiber that have been twisted, attenuated and freed of foreign matter.

Fiber tows are generally compactly associated bundles of continuous fibers, which can be twisted together to give yarns in some embodiments. Yarns include closely associated bundles of twisted fibers, wherein each fiber diameter in the yarn is relatively uniform. Yarns have varying weights described by their 'tex,' (expressed as weight in grams per 1000 linear meters), or 'denier' (expressed as weight in pounds per 10,000 yards). For yarns, a typical tex range is usually between about 200 and about 2000.

Fiber braids are rope-like structures of densely packed continuous fibers. Such rope-like structures can be assembled from yarns, for example. Braided structures can optionally include a hollow portion. Alternately, a braided structure can be assembled about another core material.

Fiber tows can also include associated bundles of untwisted continuous fibers. Thus, fiber tows are a convenient form for manipulating large quantities of substantially parallel fibers in a single operation. As in yarns, the individual fiber diameters in a fiber tow are generally uniform. Fiber tows also have varying weights and a tex range that is usually between about 200 and 2000. In addition, fiber tows are frequently characterized by the number of thousands of individual fibers in the fiber tow, such as, for example, a 12K tow, a 24K tow, a 48K tow, and the like.

Tapes and ribbons contain continuous fibers that can be assembled as weaves or as non-woven flattened fiber tows, for example. Tapes can vary in width and are generally two-sided structures similar to a ribbon. In a tape or ribbon, carbon nanotubes can be infused on one or both sides thereof. Further, carbon nanotubes of different types, diameters or lengths can be grown on each side of a tape or a ribbon.

In some embodiments, the continuous fibers can be organized into fabric or sheet-like structures. These include, for example, woven fabrics, non-woven fabrics, non-woven fiber mats and fiber plies, in addition to the tapes described above. Such higher ordered structures can be assembled from parent continuous fibers, fiber tows, yarns, or the like.

In some embodiments, the present electrical devices can further include an electrolyte in contact with each electrode layer. The identity of the electrolyte is not particularly limited. In some embodiments, the electrolyte can be an inorganic electrolyte. In other embodiments, the electrolyte can be an organic electrolyte. As one of ordinary skill in the art will recognize, aqueous (inorganic) electrolytes offer low internal resistance values but have a working voltage range limited to about 1 V. In contrast, organic electrolytes have a working voltage range of up to about 2.5 V or about 3 V but have a higher internal resistance. As with other parameters associated with the electrical devices of the present embodiments, the electrolyte identity and concentration can be altered to account for different end uses Illustrative aqueous electrolytes include aqueous acid solutions (e.g., sulfuric acid, phosphoric acid, hydrochloric acid, and the like), aqueous base solutions (e.g., sodium hydroxide or potassium hydroxide), and neutral solutions. Neutral electrolyte solutions are generally formed by dissolving a salt in an aqueous medium. Illustrative salts that are suitable for use as neutral electrolytes include, for example, sodium chloride, potassium chloride, sodium oxide, potassium oxide, sodium sulfate, potassium sulfate, and the like. Additional aqueous electrolytes can be envisioned by one having ordinary skill in the art. In general, the concentration of the aqueous electrolyte can vary over a wide range. In some embodiments, the concentration can range between about 0.1 M and 20 M or between about 1 wt. % and 100 wt. %.

Organic electrolytes include an electrolytic species dissolved in an organic solvent. Illustrative electrolytic species include, for example, tetraalkylammonium salts (e.g., tetraethylammonium or tetramethylammonium halides and hydroxides); quaternary phosphonium salts; and lithium, sodium or potassium tetrafluoroborates, perchlorates, hexafluorophosphates, bis(trifluoromethane)sulfonates, bis(trifluoromethane)sulfonylimides, or tris(trifluoromethane) sulfonylmethides. In general, the concentration of the electrolytic species in the organic solvent can vary over a wide range. The concentration of the electrolytic species can range between about 0.1 M and about 5 M in some embodiments or between about 0.5 M and about 3 M in other embodiments.

Organic solvents used in organic electrolytes are generally aprotic organic solvents having a high dielectric constant. Illustrative organic solvents that can be used in an organic electrolyte include, without limitation, alkyl carbonates (e.g., propylene carbonate, ethylene carbonate, butylene carbonate, dimethyl carbonate, diethyl carbonate, dipropyl carbonate, methyl ethyl carbonate, methyl butyl carbonate, methyl propyl carbonate, ethyl propyl carbonate, butyl propyl carbonate, 1,2-butylene carbonate, 2,3-butylene carbonate, 1,2-pentene carbonate, and 2,3-pentene carbonate), nitriles (e.g., acetonitrile, acrylonitrile, propionitrile, butyronitrile and benzonitrile), sulfoxides (e.g., dimethyl sulfoxide, diethyl sulfoxide, ethyl methyl sulfoxide, and benzylmethyl sulfoxide), amides (e.g., formamide, methylformamide, and dimethylformamide), pyrrolidones (e.g., N-methylpyrrolidone), lactones (e.g., γ-butyrolactone, γ-valerolactone, 2-methyl-γ-butyrolactone, and acetyl-γ-butyrolactone), phosphate triesters, nitromethane, ethers (e.g., 1,2-dimethoxyethane; 1,2-diethoxyethane; 1,2-methoxyethoxyethane; 1,2- or 1,3-dimethoxypropane; 1,2- or 1,3-diethoxypropane; 1,2- or 1,3-ethoxymethoxypropane; 1,2-dibutoxyethane; tetrahydrofuran; 2-methyltetrahydrofuran and other alkyl, dialkyl, alkoxy or dialkoxy tetrahydrofurans; 1,4-dioxane; 1,3-dioxolane; 1,4-dioxolane; 2-methyl-1,3-dioxolane; 4-methyl-1,3-dioxolane; sulfolane; 3-methylsulfolane; methyl ether; ethyl ether; propyl ether; diethylene glycol dialkyl ether; triethylene glycol dialkyl ethers; ethylene glycol dialkyl ethers; and tetraethylene glycol dialkyl ethers), esters (e.g., alkyl propionates such as methyl or ethyl propionate, dialkyl malonates such as diethyl malonate, alkyl acetates such as methyl acetate and ethyl acetate, and alkyl formates such as methyl formate and ethyl formate); and maleic anhydride. In addition, organic gels and the like can be used, if desired.

In some embodiments, the electrolyte can be an ionic liquid such as, for example, benzyldimethylpropylammonium aluminum tetrachlorate, benzyldimethylammonium imide, ethylmethylammonium bisulfate, 1-butyl-3-methylimidazolium tetrafluoroborate, or tetraethylammonium tetrafluoroborate. Any of the above organic solvents can optionally be used in combination with such ionic liquids.

In some embodiments, the electrical devices can further include a separator material disposed between each electrode layer. In such embodiments, each electrode layer can be electrically isolated from one another. In some embodiments, the separator material can be permeable to charge carriers, such as ions from an electrolyte.

In some embodiments, the present electrical devices can further include an electrolyte in contact with each electrode layer, and a layer of separator material disposed between each electrode layer, where the separator material is permeable to ions of the electrolyte. In such embodiments, the electrical devices can comprise a supercapacitor. While the following description is primarily directed to supercapacitor embodiments of the present electrical devices, it is to be recognized that the various elements described hereinbelow can be incorporated in any like electrical device, whether a supercapacitor or not.

In general, the layer of separator material in a supercapacitor or like electrical device can be formed from any material of sufficient thickness that is capable of maintaining charge separation (e.g., of electrolyte ions) once the supercapacitor is in a charged state. In general, the separator material can be a thin film dielectric substance that is porous in nature and allows for high ion mobility between the electrode layers when the supercapacitor is charging or discharging but is capable of maintaining charge separation and electrical isolation of the electrode layers when the supercapacitor is in a charged state. Thus, the layer of separator material can be selectively permeable to the movement of charge carriers across it. Generally, any separator material that can be used in batteries can be used in a like manner in supercapacitors. In some embodiments, the separator material can be a non-woven polymer fabric such as, for example, polyethylene non-woven fabrics, polypropylene non-woven fabrics, polyester non-woven fabrics, or polyacrylonitrile non-woven fabrics. In other embodiments, the separator material can be a porous substance such as, for example, a porous poly(vinylidene fluoride)-hexafluoropropane copolymer film, a porous cellulose film, kraft paper, rayon woven fabrics, and the like. Separator materials made from other materials can be envisioned by one having ordinary skill in the art.

The degree of porosity of the separator material is generally such that charge carriers (e.g., electrolyte ions) are sufficiently mobile so as to move across the separator material when the supercapacitor is being charged or discharged but sufficiently immobile so as to maintain charge separation and electrode electrical isolation once the supercapacitor reaches a charged state. In some embodiments, the porosity of the separator material is greater than about 90%. In some embodiments, the porosity of the separator material ranges between about 90% and about 95%. In other embodiments, the porosity of the separator material ranges between about 90% and about 40%, or between about 87% and about 50%, or between about 85% and about 65%.

In addition to porosity, the thickness of the separator material can influence the degree of ion mobility across the separator material. For a given porosity, a thicker layer of separator material generally provides greater charge separation and lower ion mobility than does a thinner layer of separator material. In some embodiments, the thickness of the layer of separator material is less than about 100 µm. In some embodiments, the thickness of the layer of separator material ranges between about 100 µm and about 50 µm. In some embodiments, the thickness of the layer of separator material ranges between about 50 µm and about 25 µm or between about 25 µm and about 10 µm. In some embodiments, the thickness of the layer of separator material is less than about 10 µm. In some embodiments, the thickness of the layer of separator material ranges between about 10 µm and about 1 µm. In some embodiments, the thickness of the layer of separator material is less than about 1 µm. In some embodiments, the thickness of the layer of separator material ranges between about 100 nm and about 1 µm. In some embodiments, the thickness of the layer of separator material can be optimized to achieve a balance between electrolyte volume and voltage standoff capability. As one of ordinary skill in the art will recognize, when separator material layers are thinner, mechanical strength can be compromised. Hence, a balance between mechanical strength and a desired degree of ion mobility may be implemented in designing a supercapacitor for a particular application.

In one embodiment, a suitable separator material can be a high porosity (e.g., >90%) polypropylene and/or polyethylene electrolytic membrane. Such electrolytic membranes are available from Celgard LLC of Charlotte, N.C. These electrolytic membranes exhibit a high electric voltage standoff capability, thereby permitting a thinner and lighter film for isolating the electrode layers. In some embodiments, a paper separator material (e.g., kraft paper) can also be used.

According to the present embodiments, adjacent electrode layers in a supercapacitor are oppositely charged, with electrical isolation being maintained by the separator material. In some embodiments, alternating electrode layers (e.g., non-adjacent electrode layers having like charge) can be electrically connected to one another. That is, in such embodiments, a first grouping of alternating electrode layers have a first charge and a second grouping of alternating electrode layers have a second charge that is opposite that of the first grouping of alternating electrode layers. In some embodiments, alternating electrode layers having like charge can each be connected to an electrode terminal. In some embodiments, the electrical devices further include a first electrode terminal and a second electrode terminal, in which the first electrode terminal is electrically connected to alternating electrode layers having a first charge and the second electrode terminal is electrically connected to alternating electrode layers having a second charge. In some embodiments, the first electrode terminal and the second electrode terminal can be attached to an outer casing that houses the electrode layers. Other locations for the first and second electrode terminals can also be envisioned by one of ordinary skill in the art.

The outer casing housing the electrode layers is typically an insulator material (e.g., a dielectric material). Illustrative insulator materials that can form the outer casing include, for example, glass and thermoplastic or thermosetting polymers. In general, the outer casing is operable to electrically isolate the electrical device housed therein and to contain a liquid electrolyte, if any, used in conjunction with the electrical device. The outer casing can also provide any needed mechanical support for the electrical device.

Figure 3:
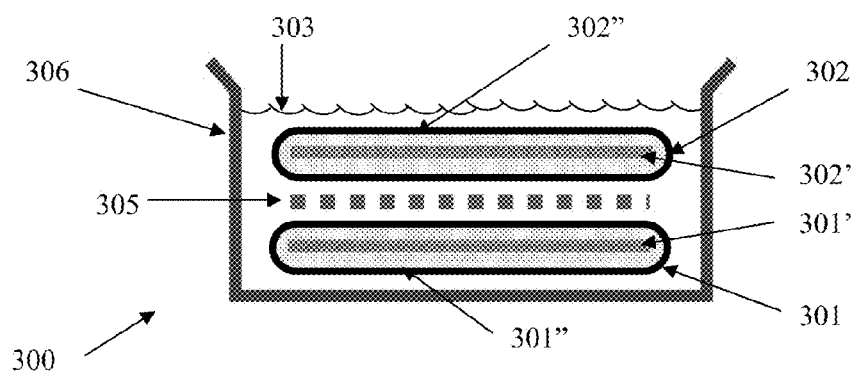
FIG. 3 shows a side view schematic of an illustrative supercapacitor having two electrode layers containing carbon nanotube-infused fibers.
Figure 4A:
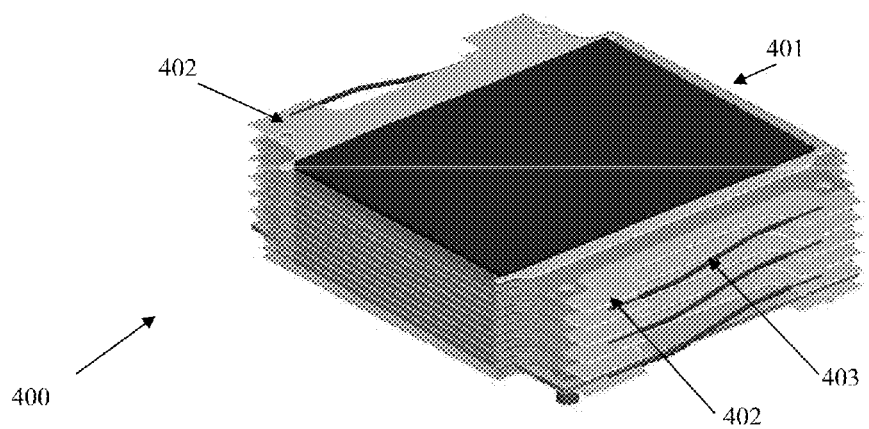
FIG. 4A shows a perspective view schematic of an illustrative supercapacitor having multiple electrode layers, each containing carbon nanotube-infused fibers, where adjacent electrode layers bear opposite charges and are electrically isolated from one another.

The arrangement of the various components described hereinabove will now be further described in relation to the drawings, which show various illustrative embodiments of a supercapacitor. FIG. 3 shows a side view schematic of an illustrative supercapacitor having two electrode layers containing carbon nanotube-infused fibers. FIG. 4A shows a perspective view schematic of an illustrative supercapacitor having multiple electrode layers, each containing carbon nanotube-infused fibers, where adjacent electrode layers bear opposite charges and are electrically isolated from one another.

Referring to FIG. 3, supercapacitor 300 contains cathode layer 301 and anode layer 302 in a reservoir 303 of electrolyte housed in outer casing 306. Cathode layer 301 and anode layer 302 each contain base plates 301' and 302', upon which are wound carbon nanotube-infused fibers 301" and 302", as shown in more detail in FIG. 2. Charge separation is maintained in supercapacitor 300 by a layer of separator material 305 that is disposed between cathode layer 301 and anode layer 302. Although FIG. 3 has been drawn with outer casing 306 having an open top surface, it is to be recognized that outer casing 306 can be either open or closed. For example, after inserting the electrode layers in outer casing 306, the outer casing can still remain open. Various means for closing outer casing 306 in order to contain electrolyte reservoir 303 therein can be envisioned by one having ordinary skill in the art (e.g., o-rings, gaskets, pressure fittings, lids, stoppers, combinations thereof, and the like). Electrode terminals or additional components can also be present on outer casing 306 (not shown).

Referring now to FIG. 4A, a schematic of an illustrative supercapacitor embodiment having multiple electrode layers is shown. Multi-electrode supercapacitor 400 has a plurality of electrode layers 401, each being separated by a layer of separator material (not visible in FIG. 4A). Each electrode layer 401 has an electrical connection 402 that is operable for making an electrical connection therewith. In multi-electrode supercapacitor 400, adjacent electrode layers have an opposite charge and alternating electrode layers have a like charge. The alternating electrode layers can be electrically connected together using connector 403 so as to connect electrode layers having like charge to an electrode terminal (not shown in FIG. 4A). Illustrative connectors can include components such as, for example, wires, solder, alligator clips, combinations thereof, and the like.

Figure 4B:
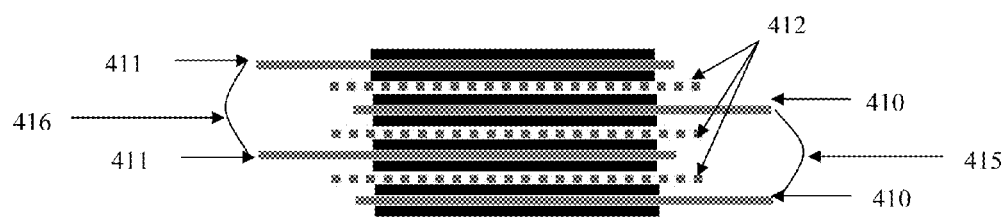
FIG. 4B shows a side view schematic of an illustrative supercapacitor containing four electrode layers, where alternating electrode layers are electrically connected to one another.

FIG. 4B shows a side view schematic of an illustrative supercapacitor containing four electrode layers, where alternating electrode layers are electrically connected to one another. FIG. 4B represents an expansion of a portion of the multi-layer supercapacitor shown in FIG. 4A. As shown in FIG. 4B, alternating electrode layers 410 and 411 bear opposite charges, and charge separation is maintained therebetween through separator material layers 412. Alternating electrode layers 410 are electrically connected together using connector 415. Likewise, alternating electrode layers 411 are electrically connected using connector 416.

In embodiments in which the electrical devices described herein form a supercapacitor, the capacitance is generally at least about 1 Farad/gram of continuous fibers. In some embodiments, the capacitance ranges between about 1 Farad/gram and about 100 Farad/gram of continuous fibers. In other embodiments, the capacitance ranges between about 1 Farad/gram and about 50 Farad/gram of continuous fibers or between about 1 Farad/gram and about 40 Farad/gram of continuous fibers, including all subranges therebetween. It is to be recognized that the net capacitance in a supercapacitor is approximately equal to the sum of the capacitance values of the individual electrode layers therein. Hence, one of ordinary skill in the art will recognize that to achieve a desired capacitance, one can simply increase or decrease the number of electrode layers in a supercapacitor prepared according to the present embodiments.

According to more particular embodiments described herein, the infused carbon nanotubes can be at least partially coated with a coating in order to increase the capacitance of a supercapacitor produced therefrom. In certain instances, the increase in capacitance can be an order of magnitude or more (e.g., at least about 10-fold greater) relative to a like supercapacitor lacking the coating on the infused carbon nanotubes. In such embodiments, the capacitance can be at least about 10 Farad/gram of continuous fibers. In some embodiments, supercapacitors having coated carbon nanotubes can have a capacitance ranging between about 10 Farad/gram and about 100 Farad/gram of continuous fibers. Additional details concerning suitable coatings for carbon nanotubes that increase capacitance are set forth hereinafter.

In various embodiments, suitable materials for coating carbon nanotubes in order to increase capacitance in a supercapacitor include, for example, conducting polymers, main group metal compounds, transition metal compounds, and combinations thereof. In some embodiments, the carbon nanotubes can be completely coated with the coating material. In other embodiments, the carbon nanotubes can be partially coated with the coating material. In some embodiments, a portion of the carbon nanotubes can be completely coated with the coating material and another portion of the carbon nanotubes can remain partially coated or uncoated.

Illustrative conducting polymers that are suitable for coating carbon nanotubes can include, for example, polypyrrole, polyaniline, polythiophene, polyacetylene, polyphenylenevinylene, combinations thereof, and the like. Such polymers can be intrinsically conducting, or they can be n- or p-doped with various dopants in order to increase their conductivity. In some embodiments, the coating can be a polypyrrole coating. Other conducting polymers art known in the art and can be substituted for the foregoing conducting polymers through routine experimentation by one having ordinary skill in the art.

In some embodiments, main group metal compounds can be suitable for use as the carbon nanotube coating. Illustrative main group metal compounds include, for example, main group metal oxides, carbides, nitrides, nitrates, sulfides, sulfates, phosphates, halides (e.g., fluorides, chlorides, bromides, and iodides), and the like. Main group metal compounds that can be suitable for use in the present embodiments include compounds such as, for example, $Li_2O$, $Li_3PO_4$, $SnO$ or $SnO_2$. In some embodiments, complex ions or oxo anions derived from a main group metal compound can be used (e.g., $SnO_4^-$). In some embodiments, a high capacity semiconductor such as silicon can be used to coat the carbon nanotubes.

In some embodiments, transition metal compounds can be suitable for use as the carbon nanotube coating. Generally, the transition metal compounds used to coat the carbon nanotubes have an oxidation state of +2 or greater. In some embodiments, the transition metal compounds can be transition metal oxides or transition metal complex ions. Illustrative transition metal oxides having such an oxidation state include, without limitation, $TiO_2$, $Cr_2O_3$, $CrO_3$, $FeO$, $Fe_3O_4$, $Fe_2O_3$, $COO$, $CO_3O_4$, $CO_2O_3$, $MnO_2$, $MoO_3$, $NiO$, $Ni_2O_3$, $CuO$, $ZrO_2$, $Nb_2O_3$, $NbO_2$, $Nb_2O_5$, $RuO_2$, $RuO_4$, $WO_3$, $OsO_2$, $OsO_4$, and $IrO_2$. Illustrative transition metal complex ions include, without limitation, $VO_4^{3-}$, $CrO_4^{2-}$, $Cr_2O_7^{2-}$, $MnO_4^-$, $MoO_4^{2-}$, $RuO_4^{2-}$, $RuO_4^-$, $WO_4^{2-}$, $OsO_2(OH)_4^{2-}$, $IrO_3^{2-}$, and $IrO_3$. In some embodiments, the coating material can be $MnO_2$. In other embodiments, the coating material can be $RuO_2$. It should be understood that transition metal compounds other than transition metal oxides or complex ions can be used in the various embodiments of the present invention. For example, coordination compounds or organometallic compounds of transition metals can also be used as the carbon nanotube coating in various alternative embodiments.

When used, the carbon nanotube coating is generally present in an amount ranging between about 1 percent and about 90 percent by weight of the carbon nanotube-infused fibers. In more particular embodiments, an amount of the carbon nanotube coating can range between about 2.5 percent and about 70 percent, or between about 5 percent and about 50 percent by weight of the carbon nanotube-infused fibers.

When used, a thickness of the carbon nanotube coating can generally range between about 0.0001 microns and about 10 microns. In more particular embodiments, a thickness of the carbon nanotube coating can range between about 0.001 microns and 1 microns, or between about 0.005 microns and about 0.5 microns.

In some embodiments, electrical devices described herein contain a plurality of stacked electrode layers, where each electrode layer contains an electrically conductive base plate and continuous fibers that are infused with carbon nanotubes and disposed about the electrically conductive base plate. The continuous fibers also contain a coating deposited on at least a portion the infused carbon nanotubes.

In various alternative embodiments, electrode layers containing continuous carbon nanotube-infused fibers can be used in combination with electrode layers that lack carbon nanotubes. That is, electrode layers containing continuous carbon nanotube-infused fibers can be used in combination with conventional electrode layers such as, for example, metal plates. When used in combination with electrode layers containing continuous carbon nanotube-infused fibers, as few as one conventional electrode layer to as many as N–1 conventional electrode layers can be employed, where N is the total number of stacked electrode layers in the electrical device.

In some embodiments, electrical devices described herein contain a plurality of stacked electrode layers, where at least one electrode layer contains continuous fibers that are infused with carbon nanotubes. In some embodiments, at least some of the stacked electrode layers lack carbon nanotubes. One of ordinary skill in the art may choose to include electrode layers lacking carbon nanotubes based upon various operational features needed in the electrical device. Any of the features of electrode layers containing continuous carbon nanotube-infused fibers that have been described hereinabove can likewise be incorporated in electrical devices containing both conventional electrode layers and continuous carbon nanotube-infused fiber electrode layers.

In some embodiments, methods for making the present electrical devices are described herein. In various embodiments, methods for making the electrical devices can include forming an electrode layer by disposing continuous fibers that are infused with carbon nanotubes about an electrically conductive base plate, and stacking a plurality of the electrode layers upon one another. In such embodiments, each electrode layer is separated by a layer of separator material. In some embodiments, the methods can further include stacking a layer of separator material between each electrode layer.

In some embodiments, the present methods can further include exposing each electrode layer to an electrolyte. In some embodiments, each electrode layer can be exposed to an electrolyte before being stacked. In such embodiments, the stacked electrodes can be used directly, or they can be exposed to further electrolyte after being stacked. In other embodiments, the electrode layers can be exposed to an electrolyte after being stacked. From an operational standpoint, exposing the completed stack of electrode layers to an electrolyte may be preferable, since fewer material handling steps are needed.

In some embodiments, the present methods can further include depositing a coating on the infused carbon nanotubes of the fiber material. Suitable coatings can include, for example, conducting polymers, main group metal compounds, transition metal compounds, and combinations thereof. In more particular embodiments, the coating being deposited on the carbon nanotubes can be selected from polypyrrole, $MnO_2$, $RuO_2$, and combinations thereof. Illustrative techniques for depositing the coating on the carbon nanotubes can include, without limitation, chemical vapor deposition, physical vapor deposition, electrodeposition, electroplating, electroless plating, dipping, spraying, combinations thereof, and the like. One of ordinary skill in the art, with the benefit of this disclosure, will be able to choose an appropriate deposition technique to deposit a coating on the carbon nanotubes. Further, one of ordinary skill in the art will recognize that certain coatings may be more readily deposited using some coating techniques rather than others.

In some embodiments, the coating can be applied to the continuous fibers prior to disposing the continuous fibers about the base plate. In such embodiments, the coating can be applied as an added operation in processes for infusing carbon nanotubes to continuous fibers, which are described in more detail hereinbelow. This approach is advantageous from an operational standpoint, as the processes for infusing carbon nanotubes to a fiber material are conducted in a continuous fashion, and the addition of a further fiber processing operation can be readily implemented by one having ordinary skill in the art. As described above, the carbon nanotubes can be completely coated with the coating in some embodiments, or the coating can be a partial coating in other embodiments.

In other embodiments, the coating can be applied to the carbon nanotubes after the continuous fibers are disposed about the base plate. In such embodiments, the coating is typically a partial coating, since at least a portion of the continuous fiber is adjacent to the base plate when the coating is being applied. This approach can be particularly advantageous for increasing capacitance, however, since only the carbon nanotube surface being exposed to an electrolyte becomes coated with the coating material. Thus, by coating the carbon nanotubes after disposing the carbon nanotube-infused fibers about the base plate, more efficient use of the coating material can be realized. That is, by coating the carbon nanotubes after disposing the carbon nanotube-infused fibers about the base plate, a higher capacitance per unit weight of coating material can be realized.

In some embodiments of the present methods, the continuous fibers can be in various fiber forms, including those described in more detail above. In some embodiments, the fiber forms can include fiber tows, fiber tapes, fiber ribbons, combinations thereof, and the like. In some embodiments, the continuous fibers can be conductive before being infused with carbon nanotubes. Illustrative continuous fibers meeting this criteria include, for example, continuous metal fibers, continuous carbon fibers, and the like.

In some embodiments, the present methods can further include compressing the electrode layers together after stacking. As noted above, compressibility represents a particular advantage of the present electrical devices. After stacking, electrical devices of the present disclosure can be compressed to an extent such that their volume is reduced by about 30 percent to about 40 percent, or even up to about 50 percent in some embodiments. Lesser volume reductions resulting from compression can be also be used, if desired.

Because of the substantially parallel orientation of the electrode layers within the present electrical devices, compression can readily occur without significant buckling or other stresses being imparted to interior layers. The ability to compress the electrical devices allows a greater electrical storage capacity per unit volume to be realized. Further, the ability to compress the electrical devices allows a smaller volume of electrolyte to be used, since there is less spacing between the electrode layers than in an uncompressed device.

In some embodiments, the present methods can further include placing the stacked electrode layers in an outer casing. In some embodiments, the methods can include placing a reservoir of electrolyte in the outer casing, either before or after placing the stacked electrode layers therein. When the electrode layers are compressed, compression can take place either before or after their being placed in the outer casing. In some embodiments, the methods can further include connecting the stacked electrode layers to electrode terminals, for example on the outer casing. Additional details concerning the outer casing have been set forth hereinabove.

Embodiments disclosed herein utilize carbon nanotube-infused fibers that can be readily prepared by methods described in commonly-owned, co-pending U.S. patent application Ser. Nos. 12/611,073, 12/611,101, 12/611,103, and 12/938,328 each of which is incorporated by reference herein in its entirety. A brief description of the processes described therein follows.

To infuse carbon nanotubes to a fiber material, the carbon nanotubes are synthesized directly on the fiber material. In some embodiments, this is accomplished by first disposing a carbon nanotube-forming catalyst (e.g., catalytic nanoparticles) on the fiber material. A number of preparatory processes can be performed prior to this catalyst deposition.

In some embodiments, the fiber material can be optionally treated with a plasma to prepare the fiber surface to accept the catalyst. For example, a plasma treated glass fiber material can provide a roughened glass fiber surface in which the carbon nanotube-forming catalyst can be deposited. In some embodiments, the plasma also serves to "clean" the fiber surface. The plasma process for "roughing" the fiber surface thus facilitates catalyst deposition. The roughness is typically on the scale of nanometers. In the plasma treatment process craters or depressions are formed that are nanometers deep and nanometers in diameter. Such surface modification can be achieved using a plasma of any one or more of a variety of different gases, including, without limitation, argon, helium, oxygen, ammonia, nitrogen and hydrogen. In addition, the plasma treatment of the fiber surface can add functional groups thereto that can be useful in some embodiments.

In some embodiments, where a fiber material being employed has a sizing material associated with it, such sizing can be optionally removed prior to catalyst deposition. Optionally, the sizing material can be removed after catalyst deposition. In some embodiments, sizing material removal can be accomplished during carbon nanotube synthesis or just prior to carbon nanotube synthesis in a pre-heat step. In other embodiments, some sizing materials can remain throughout the entire carbon nanotube synthesis process.

Yet another optional step prior to or concomitant with deposition of the carbon nanotube-forming catalyst (i.e., catalytic nanoparticles) is application of a barrier coating on the fiber material. Barrier coatings are materials designed to protect the integrity of sensitive fiber materials, such as carbon fibers, organic fibers, glass fibers, metal fibers, and the like. Such a barrier coating can include, for example, an alkoxysilane, an alumoxane, alumina nanoparticles, spin on glass and glass nanoparticles. For example, in an embodiment the barrier coating is Accuglass T-11 Spin-On Glass (Honeywell International Inc., Morristown, N.J.). The carbon nanotube-forming catalyst can be added to the uncured barrier coating material and then applied to the fiber material together, in one embodiment. In other embodiments, the barrier coating material can be added to the fiber material prior to deposition of the carbon nanotube-forming catalyst. In such embodiments, the barrier coating can be partially cured prior to catalyst deposition. The barrier coating material can be of a sufficiently thin thickness to allow exposure of the carbon nanotube-forming catalyst to the carbon feedstock gas for subsequent CVD- or like carbon nanotube growth. In some embodiments, the barrier coating thickness is less than or about equal to the effective diameter of the carbon nanotube-forming catalyst. Once the carbon nanotube-forming catalyst and the barrier coating are in place, the barrier coating can be fully cured. In some embodiments, the thickness of the barrier coating can be greater than the effective diameter of the carbon nanotube-forming catalyst so long as it still permits access of carbon nanotube feedstock gases to the sites of the catalyst. Such barrier coatings can be sufficiently porous to allow access of carbon feedstock gases to the carbon nanotube-forming catalyst.

In some embodiments, the thickness of the barrier coating ranges between about 10 nm and about 100 nm. In other embodiments, the thickness of the barrier coating ranges between about 10 nm and about 50 nm, including 40 nm. In some embodiments, the thickness of the barrier coating is less than about 10 nm, including about 1 nm, about 2 nm, about 3 nm, about 4 nm, about 5 nm, about 6 nm, about 7 nm, about 8 nm, about 9 nm, and about 10 nm, including all values and subranges therebetween.

Without being bound by theory, the barrier coating can serve as an intermediate layer between the fiber material and the carbon nanotubes and mechanically infuses the carbon nanotubes to the fiber material. Such mechanical infusion via a barrier coating provides a robust system for carbon nanotube growth in which the fiber material serves as a platform for organizing the carbon nanotubes, while still allowing the beneficial carbon nanotube properties to be conveyed to the fiber material. Moreover, benefits of including a barrier coating include, for example, protection of the fiber material from chemical damage due to moisture exposure and/or thermal damage at the elevated temperatures used to promote carbon nanotube growth.

As described further below, the carbon nanotube-forming catalyst can be prepared as a liquid solution that contains the carbon nanotube-forming catalyst as transition metal catalytic nanoparticles. The diameters of the synthesized carbon nanotubes are related to the size of the transition metal catalytic nanoparticles as described above.

Carbon nanotube synthesis can be based on a chemical vapor deposition (CVD) process or related carbon nanotube growth process which occurs at elevated temperatures. In some embodiments, the CVD-based growth process can be plasma-enhanced by providing an electric field during the growth process such that the carbon nanotube growth follows the direction of the electric field. Other illustrative carbon nanotube growth processes include, for example, micro-cavity, laser ablation, flame synthesis, arc discharge, and high pressure carbon monoxide (HiPCO) synthesis. The specific temperature is a function of catalyst choice, but can typically be in a range of about 500° C. to about 1000° C. Accordingly, carbon nanotube synthesis involves heating the fiber material to a temperature in the aforementioned range to support carbon nanotube growth.

In some embodiments, CVD-promoted carbon nanotube growth on the catalyst-laden fiber material is performed. The CVD process can be promoted by, for example, a carbon-containing feedstock gas such as acetylene, ethylene, and/or ethanol. The carbon nanotube growth processes also generally use an inert gas (e.g., nitrogen, argon, and/or helium) as a primary carrier gas. The carbon-containing feedstock gas is typically provided in a range from between about 0% to about 15% of the total mixture. A substantially inert environment for CVD growth can be prepared by removal of moisture and oxygen from the growth chamber.

In the carbon nanotube growth process, carbon nanotubes grow at the sites of transition metal catalytic nanoparticles that are operable for carbon nanotube growth. The presence of a strong plasma-creating electric field can be optionally employed to affect carbon nanotube growth. That is, the growth tends to follow the direction of the electric field. By properly adjusting the geometry of the plasma spray and electric field, vertically aligned carbon nanotubes (i.e., perpendicular to the surface of the fiber material) can be synthesized. Under certain conditions, even in the absence of a plasma, closely-spaced carbon nanotubes can maintain a substantially vertical growth direction resulting in a dense array of carbon nanotubes resembling a carpet or forest.

Returning to the catalyst deposition process, a carbon nanotube-forming catalyst is deposited to provide a layer (typically no more than a monolayer) of catalytic nanoparticles on the fiber material for the purpose of growing carbon nanotubes thereon. The operation of depositing catalytic nanoparticles on the fiber material can be accomplished by a number of techniques including, for example, spraying or dip coating a solution of catalytic nanoparticles or by gas phase deposition, which can occur by a plasma process. Thus, in some embodiments, after forming a catalyst solution in a solvent, the catalyst can be applied by spraying or dip coating the fiber material with the solution, or combinations of spraying and dip coating. Either technique, used alone or in combination, can be employed once, twice, thrice, four times, up to any number of times to provide a fiber material that is sufficiently uniformly coated with catalytic nanoparticles that are operable for formation of carbon nanotubes. When dip coating is employed, for example, a fiber material can be placed in a first dip bath for a first residence time in the first dip bath. When employing a second dip bath, the fiber material can be placed in the second dip bath for a second residence time. For example, fiber materials can be subjected to a solution of carbon nanotube-forming catalyst for between about 3 seconds to about 90 seconds depending on the dip configuration and linespeed. Employing spraying or dip coating processes, a fiber material with a catalyst surface density of less than about 5% surface coverage to as high as about 80% surface coverage can be obtained. At higher surface densities (e.g., about 80%), the carbon nanotube-forming catalyst nanoparticles are nearly a monolayer. In some embodiments, the process of coating the carbon nanotube-forming catalyst on the fiber material produces no more than a monolayer. For example, carbon nanotube growth on a stack of carbon nanotube-forming catalyst can erode the degree of infusion of the carbon nanotubes to the fiber material. In other embodiments, transition metal catalytic nanoparticles can be deposited on the fiber material using evaporation techniques, electrolytic deposition techniques, and other processes known to those of ordinary skill in the art, such as addition of the transition metal catalyst to a plasma feedstock gas as a metal organic, metal salt or other composition promoting gas phase transport.

Because processes to manufacture carbon nanotube-infused fibers are designed to be continuous, a spoolable fiber material can be dip-coated in a series of baths where dip coating baths are spatially separated. In a continuous process in which nascent fibers are being generated de novo, such as newly formed glass fibers from a furnace, dip bath or spraying of a carbon nanotube-forming catalyst can be the first step after sufficiently cooling the newly formed fiber material. In some embodiments, cooling of newly formed glass fibers can be accomplished with a cooling jet of water which has the carbon nanotube-forming catalyst particles dispersed therein.

In some embodiments, application of a carbon nanotube-forming catalyst can be performed in lieu of application of a sizing when generating a fiber and infusing it with carbon nanotubes in a continuous process. In other embodiments, the carbon nanotube-forming catalyst can be applied to newly formed fiber materials in the presence of other sizing agents. Such simultaneous application of a carbon nanotube-forming catalyst and other sizing agents can provide the carbon nanotube-forming catalyst in surface contact with the fiber material to insure carbon nanotube infusion. In yet further embodiments, the carbon nanotube-forming catalyst can be applied to nascent fibers by spray or dip coating while the fiber material is in a sufficiently softened state, for example, near or below the annealing temperature, such that the carbon nanotube-forming catalyst is slightly embedded in the surface of the fiber material. When depositing the carbon nanotube-forming catalyst on hot glass fiber materials, for example, care should be given to not exceed the melting point of the carbon nanotube-forming catalyst, thereby causing nanoparticle fusion and loss of control of the carbon nanotube characteristics (e.g., diameter) as a result.

Carbon nanotubes infused to a fiber material can serve to protect the fiber material from conditions including, for example, moisture, oxidation, abrasion, compression and/or other environmental conditions. In this case, the carbon nanotubes themselves can act as a sizing agent. Such a carbon nanotube-based sizing agent can be applied to a fiber material in lieu of or in addition to conventional sizing agents. When present, conventional sizing agents can be applied before or after the infusion and growth of carbon nanotubes on the fiber material. Conventional sizing agents vary widely in type and function and include, for example, surfactants, anti-static agents, lubricants, siloxanes, alkoxysilanes, aminosilanes, silanes, silanols, polyvinyl alcohol, starch, and mixtures thereof. Such conventional sizing agents can be used to protect the carbon nanotubes themselves from various conditions or to convey further properties to the fiber material that are not imparted by the carbon nanotubes. In some embodiments, a conventional sizing agent can be removed from the fiber material prior to carbon nanotube growth. Optionally, a conventional sizing agent can be replaced with another conventional sizing agent that is more compatible with the carbon nanotubes or the carbon nanotube growth conditions.

The carbon nanotube-forming catalyst solution can be a transition metal nanoparticle solution of any d-block transition metal. In addition, the nanoparticles can include alloys and non-alloy mixtures of d-block metals in elemental form, in salt form, and mixtures thereof. Such salt forms include, without limitation, oxides, carbides, nitrides, nitrates, sulfides, sulfates, phosphates, halides (e.g., fluorides, chlorides, bromides, and iodides), acetates and the like. Non-limiting illustrative transition metal nanoparticles include, for example, Ni, Fe, Co, Mo, Cu, Pt, Au, and Ag, salts thereof and mixtures thereof. Many transition metal nanoparticle catalysts are readily commercially available from a variety of suppliers, including, for example, Ferrotec Corporation (Bedford, N.H.).

Catalyst solutions used for applying the carbon nanotube-forming catalyst to the fiber material can be in any common solvent that allows the carbon nanotube-forming catalyst to be uniformly dispersed throughout. Such solvents can include, without limitation, water, acetone, hexane, isopropyl alcohol, toluene, ethanol, methanol, tetrahydrofuran (THF), cyclohexane or any other solvent with controlled polarity to create an appropriate dispersion of the carbon nanotube-forming catalytic nanoparticles therein. Concentrations of carbon nanotube-forming catalyst in the catalyst solution can be in a range from about 1:1 to about 1:10,000 catalyst to solvent.

In some embodiments, after applying the carbon nanotube-forming catalyst to the fiber material, the fiber material can be optionally heated to a softening temperature. This step can aid in embedding the carbon nanotube-forming catalyst in the surface of the fiber material to encourage seeded growth and prevent tip growth where the catalyst floats at the tip of the leading edge a growing carbon nanotube. In some embodiments heating of the fiber material after disposing the carbon nanotube-forming catalyst on the fiber material can be at a temperature between about 500° C. and about 1000° C. Heating to such temperatures, which can be used for carbon nanotube growth, can serve to remove any pre-existing sizing agents on the fiber material allowing deposition of the carbon nanotube-forming catalyst directly on the fiber material. In some embodiments, the carbon nanotube-forming catalyst can also be placed on the surface of a sizing coating prior to heating. The heating step can be used to remove sizing material while leaving the carbon nanotube-forming catalyst disposed on the surface of the fiber material. Heating at these temperatures can be performed prior to or substantially simultaneously with introduction of a carbon-containing feedstock gas for carbon nanotube growth.

In some embodiments, the process of infusing carbon nanotubes to a fiber material includes removing sizing agents from the fiber material, applying a carbon nanotube-forming catalyst to the fiber material after sizing removal, heating the fiber material to at least about 500° C., and synthesizing carbon nanotubes on the fiber material. In some embodiments, operations of the carbon nanotube infusion process include removing sizing from a fiber material, applying a carbon nanotube-forming catalyst to the fiber material, heating the fiber material to a temperature operable for carbon nanotube synthesis and spraying a carbon plasma onto the catalyst-laden fiber material. Thus, where commercial fiber materials are employed, processes for constructing carbon nanotube-infused fibers can include a discrete step of removing sizing from the fiber material before disposing the catalytic nanoparticles on the fiber material. Some commercial sizing materials, if present, can prevent surface contact of the carbon nanotube-forming catalyst with the fiber material and inhibit carbon nanotube infusion to the fiber material. In some embodiments, where sizing removal is assured under carbon nanotube growth conditions, sizing removal can be performed after deposition of the carbon nanotube-forming catalyst but just prior to or during providing a carbon-containing feedstock gas.

The step of synthesizing carbon nanotubes can include numerous techniques for forming carbon nanotubes, including, without limitation, micro-cavity, thermal or plasma-enhanced CVD techniques, laser ablation, arc discharge, flame synthesis, and high pressure carbon monoxide (HiPCO). During CVD, in particular, a sized fiber material with carbon nanotube-forming catalyst disposed thereon, can be used directly. In some embodiments, any conventional sizing agents can be removed during carbon nanotube synthesis. In some embodiments other sizing agents are not removed, but do not hinder carbon nanotube synthesis and infusion to the fiber material due to the diffusion of the carbon-containing feedstock gas through the sizing. In some embodiments, acetylene gas can be ionized to create a jet of cold carbon plasma for carbon nanotube synthesis. The plasma is directed toward the catalyst-laden fiber material. Thus, in some embodiments synthesizing carbon nanotubes on a fiber material includes (a) forming a carbon plasma; and (b) directing the carbon plasma onto the catalyst disposed on the fiber material. The diameters of the carbon nanotubes that are grown are dictated by the size of the carbon nanotube-forming catalyst. In some embodiments, a sized fiber material can be heated to between about 550° C. and about 800° C. to facilitate carbon nanotube growth. To initiate the growth of carbon nanotubes, two or more gases are bled into the reactor: an inert carrier gas (e.g., argon, helium, or nitrogen) and a carbon-containing feedstock gas (e.g., acetylene, ethylene, ethanol or methane). Carbon nanotubes grow at the sites of the carbon nanotube-forming catalyst.

In some embodiments, a CVD growth process can be plasma-enhanced. A plasma can be generated by providing an electric field during the growth process. Carbon nanotubes grown under these conditions can follow the direction of the electric field. Thus, by adjusting the geometry of the reactor, vertically aligned carbon nanotubes can be grown where the carbon nanotubes are substantially perpendicular to the surface of the fiber material (i.e., radial growth). In some embodiments, a plasma is not required for radial growth to occur about the fiber material. For fiber materials that have distinct sides such as, for example, tapes, mats, fabrics, plies, and the like, the carbon nanotube-forming catalyst can be disposed on one or both sides of the fiber material. Correspondingly, under such conditions, carbon nanotubes can be grown on one or both sides of the fiber material as well.

As described above, the carbon nanotube synthesis is performed at a rate sufficient to provide a continuous process for infusing spoolable length fiber materials with carbon nanotubes. Numerous apparatus configurations facilitate such a continuous synthesis as exemplified below.

In some embodiments, carbon nanotube-infused fiber materials can be prepared in an "all-plasma" process. In such embodiments, the fiber materials pass through numerous plasma-mediated steps to form the final carbon nanotube-infused fiber materials. The first of the plasma processes, can include a step of fiber surface modification. This is a plasma process for "roughing" the surface of the fiber material to facilitate catalyst deposition, as described above. Optionally, a functionalization of the fiber material can also be involved. As also described above, surface modification can be achieved using a plasma of any one or more of a variety of different gases, including, without limitation, argon, helium, oxygen, ammonia, hydrogen, and nitrogen.

After surface modification, the fiber material proceeds to catalyst application. In the present all-plasma process, this step is a plasma process for depositing the carbon nanotube-forming catalyst on the fiber material. The carbon nanotube-forming catalyst is typically a transition metal as described above. The transition metal catalyst can be added to a plasma feedstock gas as a precursor in non-limiting forms including, for example, a ferrofluid, a metal organic, a metal salt, mixtures thereof or any other composition suitable for promoting gas phase transport. The carbon nanotube-forming catalyst can be applied at room temperature in ambient environment with neither vacuum nor an inert atmosphere being required. In some embodiments, the fiber material can be cooled prior to catalyst application.

Continuing the all-plasma process, carbon nanotube synthesis occurs in a carbon nanotube-growth reactor. Carbon nanotube growth can be achieved through the use of plasma-enhanced chemical vapor deposition, wherein carbon plasma is sprayed onto the catalyst-laden fibers. Since carbon nanotube growth occurs at elevated temperatures (typically in a range of about 500° C. to about 1000° C. depending on the catalyst), the catalyst-laden fibers can be heated prior to being exposed to the carbon plasma. For the carbon nanotube infusion process, the fiber material can be optionally heated until softening occurs. After heating, the fiber material is ready to receive the carbon plasma. The carbon plasma can be generated, for example, by passing a carbon-containing feedstock gas such as, for example, acetylene, ethylene, ethanol, and the like, through an electric field that is capable of ionizing the gas. This cold carbon plasma is directed, via spray nozzles, to the fiber material. The fiber material can be in close proximity to the spray nozzles, such as within about 1 centimeter of the spray nozzles, to receive the plasma. In some embodiments, heaters can be disposed above the fiber material at the plasma sprayers to maintain the elevated temperature of the fiber material.

Another configuration for continuous carbon nanotube synthesis involves a special rectangular reactor for the synthesis and growth of carbon nanotubes directly on fiber materials. The reactor can be designed for use in a continuous in-line process for producing carbon nanotube-infused fiber materials. In some embodiments, carbon nanotubes are grown via a CVD process at atmospheric pressure and an elevated temperature in the range of about 550° C. and about 800° C. in a multi-zone reactor. The fact that the carbon nanotube synthesis occurs at atmospheric pressure is one factor that facilitates the incorporation of the reactor into a continuous processing line for carbon nanotube infusion to the fiber materials. Another advantage consistent with in-line continuous processing using such a zone reactor is that carbon nanotube growth occurs in seconds, as opposed to minutes (or longer), as in other procedures and apparatus configurations typical in the art.

Carbon nanotube synthesis reactors in accordance with the various embodiments include the following features:

Rectangular Configured Synthesis Reactors:

The cross-section of a typical carbon nanotube synthesis reactor known in the art is circular. There are a number of reasons for this including, for example, historical reasons (e.g., cylindrical reactors are often used in laboratories) and convenience (e.g., flow dynamics are easy to model in cylindrical reactors, heater systems readily accept circular tubes (e.g., quartz, etc.), and ease of manufacturing. Departing from the cylindrical convention, the present disclosure provides a carbon nanotube synthesis reactor having a rectangular cross section. The reasons for the departure include at least the following:

1) Inefficient Use of Reactor Volume.

Since many fiber materials that can be processed by the reactor are relatively planar (e.g., flat tapes, sheet-like forms, or spread tows or rovings), a circular cross-section is an inefficient use of the reactor volume. This inefficiency results in several drawbacks for cylindrical carbon nanotube synthesis reactors including, for example, a) maintaining a sufficient system purge; increased reactor volume requires increased gas flow rates to maintain the same level of gas purge, resulting in inefficiencies for high volume production of carbon nanotubes in an open environment; b) increased carbon-containing feedstock gas flow rates; the relative increase in inert gas flow for system purge, as per a) above, requires increased carbon-containing feedstock gas flow rates. Consider that the volume of an illustrative 12K glass fiber roving is about 2000 times less than the total volume of a synthesis reactor having a rectangular cross-section. In an equivalent cylindrical reactor (i.e., a cylindrical reactor that has a width that accommodates the same planarized glass fiber material as the rectangular cross-section reactor), the volume of the glass fiber material is about 17,500 times less than the volume of the reactor. Although gas deposition processes, such as CVD, are typically governed by pressure and temperature alone, volume can have a significant impact on the efficiency of deposition. With a rectangular reactor there is a still excess volume, and this excess volume facilitates unwanted reactions. However, a cylindrical reactor has about eight times that volume available for facilitating unwanted reactions. Due to this greater opportunity for competing reactions to occur, the desired reactions effectively occur more slowly in a cylindrical reactor. Such a slow down in carbon nanotube growth, is problematic for the development of continuous growth processes. Another benefit of a rectangular reactor configuration is that the reactor volume can be decreased further still by using a small height for the rectangular chamber to make the volume ratio better and the reactions even more efficient. In some embodiments disclosed herein, the total volume of a rectangular synthesis reactor is no more than about 3000 times greater than the total volume of a fiber material being passed through the synthesis reactor. In some further embodiments, the total volume of the rectangular synthesis reactor is no more than about 4000 times greater than the total volume of the fiber material being passed through the synthesis reactor. In some still further embodiments, the total volume of the rectangular synthesis reactor is less than about 10,000 times greater than the total volume of the fiber material being passed through the synthesis reactor. Additionally, it is notable that when using a cylindrical reactor, more carbon-containing feedstock gas is required to provide the same flow percent as compared to reactors having a rectangular cross section. It should be appreciated that in some other embodiments, the synthesis reactor has a cross-section that is described by polygonal forms that are not rectangular, but are relatively similar thereto and provide a similar reduction in reactor volume relative to a reactor having a circular cross section; and c) problematic temperature distribution; when a relatively small-diameter reactor is used, the temperature gradient from the center of the chamber to the walls thereof is minimal, but with increased reactor size, such as would be used for commercial-scale production, such temperature gradients increase. Temperature gradients result in product quality variations across the fiber material (i.e., product quality varies as a function of radial position). This problem is substantially avoided when using a reactor having a rectangular cross-section. In particular, when a planar substrate is used, reactor height can be maintained constant as the size of the substrate scales upward. Temperature gradients between the top and bottom of the reactor are essentially negligible and, as a consequence, thermal issues and the product-quality variations that result are avoided.

2) Gas Introduction.

Because tubular furnaces are normally employed in the art, typical carbon nanotube synthesis reactors introduce gas at one end and draw it through the reactor to the other end. In some embodiments disclosed herein, gas can be introduced at the center of the reactor or within a target growth zone, symmetrically, either through the sides or through the top and bottom plates of the reactor. This improves the overall carbon nanotube growth rate because the incoming feedstock gas is continuously replenishing at the hottest portion of the system, which is where carbon nanotube growth is most active.

Zoning.

Chambers that provide a relatively cool purge zone extend from both ends of the rectangular synthesis reactor. Applicants have determined that if a hot gas were to mix with the external environment (i.e., outside of the rectangular reactor), there would be increased degradation of the fiber material. The cool purge zones provide a buffer between the internal system and external environments. Carbon nanotube synthesis reactor configurations known in the art typically require that the substrate is carefully (and slowly) cooled. The cool purge zone at the exit of the present rectangular carbon nanotube growth reactor achieves the cooling in a short period of time, as required for continuous in-line processing.

Non-Contact, Hot-Walled, Metallic Reactor.

In some embodiments, a metallic hot-walled reactor (e.g., stainless steel) is employed. Use of this type of reactor can appear counterintuitive because metal, and stainless steel in particular, is more susceptible to carbon deposition (i.e., soot and by-product formation). Thus, most carbon nanotube synthesis reactors are made from quartz because there is less carbon deposited, quartz is easier to clean, and quartz facilitates sample observation. However, Applicants have observed that the increased soot and carbon deposition on stainless steel results in more consistent, efficient, faster, and stable carbon nanotube growth. Without being bound by theory it has been indicated that, in conjunction with atmospheric operation, the CVD process occurring in the reactor is diffusion limited. That is, the carbon nanotube-forming catalyst is "overfed;" too much carbon is available in the reactor system due to its relatively higher partial pressure (than if the reactor was operating under partial vacuum). As a consequence, in an open system—especially a clean one—too much carbon can adhere to the particles of carbon nanotube-forming catalyst, compromising their ability to synthesize carbon nanotubes. In some embodiments, the rectangular reactor is intentionally run when the reactor is "dirty," that is with soot deposited on the metallic reactor walls. Once carbon deposits to a monolayer on the walls of the reactor, carbon will readily deposit over itself. Since some of the available carbon is "withdrawn"

due to this mechanism, the remaining carbon feedstock, in the form of radicals, reacts with the carbon nanotube-forming catalyst at a rate that does not poison the catalyst. Existing systems run "cleanly" which, if they were open for continuous processing, would produce a much lower yield of carbon nanotubes at reduced growth rates.

Although it is generally beneficial to perform carbon nanotube synthesis "dirty" as described above, certain portions of the apparatus (e.g., gas manifolds and inlets) can nonetheless negatively impact the carbon nanotube growth process when soot creates blockages. In order to combat this problem, such areas of the carbon nanotube growth reaction chamber can be protected with soot inhibiting coatings such as, for example, silica, alumina, or MgO. In practice, these portions of the apparatus can be dip-coated in these soot inhibiting coatings. Metals such as INVAR® can be used with these coatings as INVAR has a similar CTE (coefficient of thermal expansion) ensuring proper adhesion of the coating at higher temperatures, preventing the soot from significantly building up in critical zones.

Combined Catalyst Reduction and Carbon Nanotube Synthesis.

In the carbon nanotube synthesis reactor disclosed herein, both catalyst reduction and carbon nanotube growth occur within the reactor. This is significant because the reduction step cannot be accomplished timely enough for use in a continuous process if performed as a discrete operation. In a typical process known in the art, a reduction step typically takes 1-12 hours to perform. Both operations occur in a reactor in accordance with the present disclosure due, at least in part, to the fact that carbon-containing feedstock gas is introduced at the center of the reactor, not the end as would be typical in the art using cylindrical reactors. The reduction process occurs as the fiber material enters the heated zone. By this point, the gas has had time to react with the walls and cool off prior to reducing the catalyst (via hydrogen radical interactions). It is this transition region where the reduction occurs. At the hottest isothermal zone in the system, carbon nanotube growth occurs, with the greatest growth rate occurring proximal to the gas inlets near the center of the reactor.

In some embodiments, when loosely affiliated fiber materials including, for example, tows or rovings are employed (e.g., a glass roving), the continuous process can include steps that spread out the strands and/or filaments of the tow or roving. Thus, as a tow or roving is unspooled it can be spread using a vacuum-based fiber spreading system, for example. When employing sized glass fiber rovings, for example, which can be relatively stiff, additional heating can be employed in order to "soften" the roving to facilitate fiber spreading. The spread fibers which contain individual filaments can be spread apart sufficiently to expose an entire surface area of the filaments, thus allowing the roving to more efficiently react in subsequent process steps. For example, a spread tow or roving can pass through a surface treatment step that is composed of a plasma system as described above. The roughened, spread fibers then can pass through a carbon nanotube-forming catalyst dip bath. The result is fibers of the glass roving that have catalyst particles distributed radially on their surface. The catalyzed-laden fibers of the roving then enter an appropriate carbon nanotube growth chamber, such as the rectangular chamber described above, where a flow through atmospheric pressure CVD or plasma enhanced-CVD process is used to synthesize carbon nanotubes at rates as high as several microns per second. The fibers of the roving, now having radially aligned carbon nanotubes, exit the carbon nanotube growth reactor.

It is understood that modifications which do not substantially affect the activity of the various embodiments of this invention are also included within the definition of the invention provided herein. Although the invention has been described with reference to the disclosed embodiments, those of ordinary skill in the art will readily appreciate that these embodiments are only illustrative of the invention. It should be understood that various modifications can be made without departing from the spirit of the invention. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and operations. All numbers and ranges disclosed above can vary by some amount. Whenever a numerical range with a lower limit and an upper limit is disclosed, any number and any subrange falling within the broader range is specifically disclosed. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted.

What is claimed is:

1. An electrical device comprising:
a plurality of stacked electrode layers, each electrode layer comprising continuous fibers that are conformally wound about a base plate, wherein the continuous fibers are infused with carbon nanotubes.

2. The electrical device of claim 1, wherein each electrode layer is substantially planar.

3. The electrical device of claim 1, wherein the base plate for each electrode layer is electrically conductive.

4. The electrical device of claim 1, wherein there is substantially no overlap between adjacent windings of the continuous fibers about each base plate.

5. The electrical device of claim 1, further comprising:
an electrolyte in contact with each electrode layer; and
a layer of separator material disposed between each electrode layer;
wherein the separator material is permeable to ions of the electrolyte.

6. The electrical device of claim 5, wherein adjacent electrode layers are oppositely charged and alternating electrode layers are electrically connected to one another.

7. The electrical device of claim 5, further comprising:
a first electrode terminal and a second electrode terminal, the first electrode terminal being electrically connected to alternating electrode layers having a first charge and the second electrode terminal being electrically connected to alternating electrode layers having a second charge.

8. The electrical device of claim 7, further comprising:
an outer casing housing the electrode layers.

9. The electrical device of claim 5, wherein the electrical device comprises a supercapacitor.

10. The electrical device of claim 9, wherein the supercapacitor has a capacitance of at least about 1 Farad/gram of continuous fibers.

11. The electrical device of claim 5, wherein the electrolyte comprises an inorganic electrolyte.

12. The electrical device of claim 5, wherein the electrolyte comprises an organic electrolyte.

13. The electrical device of claim 1, wherein the continuous fibers comprise a fiber form selected from the group consisting of a fiber tow, a fiber tape, a fiber ribbon, and combinations thereof.

14. The electrical device of claim 1, wherein the continuous fibers are electrically conductive before being infused with carbon nanotubes.

15. The electrical device of claim 14, wherein the continuous fibers comprise continuous metal fibers.

16. The electrical device of claim 14, wherein the continuous fibers comprise continuous carbon fibers.

17. The electrical device of claim 1, wherein the infused carbon nanotubes are substantially perpendicular to the surface of the continuous fibers.

18. The electrical device of claim 1, wherein the continuous fibers further comprise a coating deposited on at least a portion of the infused carbon nanotubes.

19. The electrical device of claim 18, wherein the coating comprises a material selected from the group consisting of a conducting polymer, a main group metal compound, a transition metal compound, and combinations thereof.

20. The electrical device of claim 18, wherein the coating comprises a material selected from the group consisting of polypyrrole, $MnO_2$, $RuO_2$, and combinations thereof.

21. An electrical device comprising:
a plurality of stacked electrode layers, each electrode layer comprising:
an electrically conductive base plate, and
continuous fibers that are infused with carbon nanotubes and wound about the electrically conductive base plate;
wherein the continuous fibers further comprise a coating deposited on at least a portion of the infused carbon nanotubes.

22. The electrical device of claim 21, wherein the coating comprises a material selected from the group consisting of a conducting polymer, a main group metal compound, a transition metal compound, and combinations thereof.

23. The electrical device of claim 21, wherein the coating comprises a material selected from the group consisting of polypyrrole, $MnO_2$, $RuO_2$, and combinations thereof.

24. The electrical device of claim 21, further comprising:
an electrolyte in contact with each electrode layer; and
a layer of separator material disposed between each electrode layer;
wherein the separator material is permeable to ions of the electrolyte.

25. The electrical device of claim 24, wherein the electrical device comprises a supercapacitor.

26. The electrical device of claim 25, wherein the coating increases a capacitance of the supercapacitor by at least about 10-fold relative to a like supercapacitor lacking the coating.

27. The electrical device of claim 25, wherein the supercapacitor has a capacitance of at least about 10 Farad/gram of continuous fibers.

28. The electrical device of claim 24, wherein adjacent electrode layers are oppositely charged and alternating electrode layers are electrically connected to one another.

29. The electrical device of claim 21, wherein the continuous fibers comprise a fiber form selected from the group consisting of a fiber tow, a fiber tape, a fiber ribbon, and combinations thereof.

30. The electrical device of claim 21, wherein the continuous fibers are electrically conductive before being infused with carbon nanotubes.

31. The electrical device of claim 30, wherein the continuous fibers comprise continuous metal fibers.

32. The electrical device of claim 30, wherein the continuous fibers comprise continuous carbon fibers.

33. The electrical device of claim 21, wherein the infused carbon nanotubes are substantially perpendicular to the surface of the continuous fibers.

34. An electrical device comprising:
a plurality of stacked electrode layers, at least one electrode layer comprising continuous fibers that are wound about a base plate, wherein the continuous fibers are infused with carbon nanotubes.

35. The electrical device of claim 34, wherein the base plate upon which the continuous fibers are wound is electrically conductive.

36. The electrical device of claim 34, further comprising:
an electrolyte in contact with each electrode layer; and
a layer of separator material disposed between each electrode layer;
wherein the separator material is permeable to ions of the electrolyte.

37. The electrical device of claim 34, wherein the continuous fibers further comprise a coating deposited on at least a portion of the infused carbon nanotubes and the coating comprises a material selected from the group consisting of a conducting polymer, a main group metal compound, a transition metal compound, and combinations thereof.

38. The electrical device of claim 37, wherein the coating comprises a material selected from the group consisting of polypyrrole, $MnO_2$, $RuO_2$, and combinations thereof.

39. The electrical device of claim 34, wherein at least some of the stacked electrode layers lack carbon nanotubes.

* * * * *

UNITED STATES PATENT AND TRADEMARK OFFICE
CERTIFICATE OF CORRECTION

PATENT NO.        : 8,780,526 B2                                    Page 1 of 1
APPLICATION NO.   : 13/117071
DATED             : July 15, 2014
INVENTOR(S)       : Fleischer et al.

It is certified that error appears in the above-identified patent and that said Letters Patent is hereby corrected as shown below:

ON THE TITLE PAGE:

Item [75]: Delete "Greogry F. Pensero" and insert --Gregory F. Pensero--

Signed and Sealed this
Seventh Day of October, 2014

Michelle K. Lee
*Deputy Director of the United States Patent and Trademark Office*